United States Patent [19]
Stolfo

[11] Patent Number: 5,748,780
[45] Date of Patent: May 5, 1998

[54] METHOD AND APPARATUS FOR IMAGING, IMAGE PROCESSING AND DATA COMPRESSION

[76] Inventor: Salvatore J. Stolfo, 80 Kenilworth Rd., Ridgewood, N.J. 07450

[21] Appl. No.: 259,527

[22] Filed: Jun. 14, 1994

Related U.S. Application Data

[63] Continuation-in-part of Ser. No. 224,273, Apr. 7, 1994.
[51] Int. Cl.$^6$ ............................................. G06K 9/36
[52] U.S. Cl. ............................................. 382/232
[58] Field of Search ............................. 382/135, 137, 382/138, 139, 218, 232, 317; 358/435, 436

[56] References Cited

U.S. PATENT DOCUMENTS

| | | |
|---|---|---|
| 3,033,449 | 5/1962 | Quinn et al. . |
| 3,699,518 | 10/1972 | Greenough et al. . |
| 3,930,237 | 12/1975 | Villers . |
| 4,041,456 | 8/1977 | Ott et al. ................... 382/135 |
| 4,148,010 | 4/1979 | Shiau ....................... 382/139 |
| 4,205,780 | 6/1980 | Burns et al. . |
| 4,300,123 | 11/1981 | McMillin et al. . |
| 4,311,914 | 1/1982 | Huber ....................... 382/137 |

(List continued on next page.)

FOREIGN PATENT DOCUMENTS

| | | |
|---|---|---|
| 0 565 912 A2 | 4/1992 | European Pat. Off. . |
| 2 087 548 | 10/1981 | United Kingdom . |
| 2 129 546 | 5/1984 | United Kingdom . |

OTHER PUBLICATIONS

Pratt, W. K., *Digital Image Processing*, generally, in its entirety.

Fischler, M. & Firschein, O. *Intelligence, The Eye, The Brain and The Computer*, generally, in its entirety.

*Three Dimensional Graphics*, Chapter 21, "Curves and Surfaces", pp. 309–330.

Gotlieb & Gotlieb, *Data Types and Structures*, Chapter 4, pp. 97–155, Prentice–Hall (1978).

Lippman, A. et al., "Coding Image Sequences for Interactive Retrieval", *Communications of the ACM*, 32(7):852–861 (1989).

(List continued on next page.)

Primary Examiner—Jose L. Couso
Attorney, Agent, or Firm—Mitchell A. Stein; Stein & Associates, P.C.

[57] ABSTRACT

A method for processing an image, consisting of a foreground and a background, to produce a highly compressed and accurate representation of the image, including the steps of scanning the image to create a digital image of the image, comparing the digital image against a codebook of stored digital images; matching the digital image with one of the stored digital images of the codebook; producing an index code identifying the background of the stored digital image as having matched the digital image; subtracting the stored digital image from the digital image to produce a second digital image representing the foreground of the stored digital image; and storing the second digital image with the index code. An apparatus is also provided for compressing images having a foreground and a background, consisting of an image scanner, a template image storage device for storing background templates, a processor system for matching a scanned image of the image with one of the background templates, resulting in a template identifier, a processor system for compensating the scanned image for the matched template to produce a foreground image, and a data compression system for compressing the foreground image.

34 Claims, 6 Drawing Sheets

U.S. PATENT DOCUMENTS

| | | |
|---|---|---|
| 4,385,285 | 5/1983 | Horst et al. |
| 4,412,252 | 10/1983 | Moore et al. |
| 4,417,136 | 11/1983 | Rushby et al. |
| 4,490,846 | 12/1984 | Ishida et al. ............................ 382/135 |
| 4,490,847 | 12/1984 | Aleksander et al. |
| 4,504,969 | 3/1985 | Suzuki et al. |
| 4,542,378 | 9/1985 | Suganuma et al. |
| 4,553,261 | 11/1985 | Froessl. |
| 4,555,617 | 11/1985 | Brooks et al. |
| 4,559,644 | 12/1985 | Kataoka et al. |
| 4,564,752 | 1/1986 | Lepic et al. |
| 4,648,053 | 3/1987 | Fridge. |
| 4,667,985 | 5/1987 | Leonard et al. |
| 4,685,141 | 8/1987 | Hoque et al. |
| 4,758,980 | 7/1988 | Tsunekawa et al. |
| 4,843,540 | 6/1989 | Stolfo. |
| 4,860,201 | 8/1989 | Stolfo. |
| 4,887,304 | 12/1989 | Terzian. |
| 4,932,065 | 6/1990 | Feldgajer. |
| 4,949,392 | 8/1990 | Barski et al. |
| 4,956,870 | 9/1990 | Hara. |
| 5,001,769 | 3/1991 | Reid-Green et al. |
| 5,003,613 | 3/1991 | Lovelady et al. |
| 5,010,580 | 4/1991 | Vincent et al. |
| 5,020,122 | 5/1991 | Walsh et al. |
| 5,020,123 | 5/1991 | Thompson. |
| 5,023,923 | 6/1991 | Sanner et al. |
| 5,033,102 | 7/1991 | Nakajima et al. |
| 5,038,392 | 8/1991 | Morris et al. |
| 5,040,226 | 8/1991 | Elischer et al. |
| 5,048,096 | 9/1991 | Beato. |
| 5,077,805 | 12/1991 | Tan ........................................ 382/137 |
| 5,140,650 | 8/1992 | Casey et al. |
| 5,159,548 | 10/1992 | Caslavka. |
| 5,175,682 | 12/1992 | Higashiyama et al. |
| 5,189,709 | 2/1993 | Wang et al. |
| 5,199,084 | 3/1993 | Kishi et al. |
| 5,208,869 | 5/1993 | Holt ........................................ 382/138 |
| 5,224,181 | 6/1993 | Tsutsumi. |
| 5,225,978 | 7/1993 | Petersen et al. |
| 5,229,589 | 7/1993 | Schneider. |
| 5,231,663 | 7/1993 | Earl et al. |
| 5,237,159 | 8/1993 | Stephens et al. |
| 5,265,007 | 11/1993 | Barnhard, Jr. et al. |
| 5,274,567 | 12/1993 | Kallin et al. |
| 5,283,557 | 2/1994 | Memarzadeh. |
| 5,285,384 | 2/1994 | Gineris. |
| 5,285,506 | 2/1994 | Crooks et al. |
| 5,293,429 | 3/1994 | Pizano et al. |
| 5,303,149 | 4/1994 | Janigian. |
| 5,321,238 | 6/1994 | Kamata et al. |
| 5,325,167 | 6/1994 | Melen. |

OTHER PUBLICATIONS

Yu, C, et al., "Efficient Placement of Audio Data on Optical Disks for Real-Time Applications", *Communications of the ACM*, 32(7):862–871 (1989).

Wallace, G.K., "The JPEG Still Picture Compression Standard", *Communications of the ACM*, 34(4):30–44 (1991).

Tanenbaum, *Modern Operating Systems*, pp. 3, 362–394.

Sigmod Record, vol. 20, No. 4, (Dec. 1991), in its entirety; with special reference to William Kent, "The Breakdown of the Information Model in Multi-Database Systems", pp. 10–15.

Sigmod Record, vol. 20, No. 4, (Dec. 1991), in its entirety; with special reference to Dipayan Gangopalhyay and Thierry Barsalou, "On the Semantic Equivalence of Heterogeneous Representations in Multimodel Multidatabase Systems", pp. 35–39.

Hasanat M. Dewan, Mauricio Hernandez, Salvatore J. Stolfo and Jae-Jun Hwang, "Predictive Dynamic Load Balancing of Parallel and Distributive Rule and Query Processing", *Proceedings of the 1994 ACM Sigmod Conference* (1994).

Rakesh Agrwal and H. V. Jagadish, "Multiprocessor Transitive Closure Algorithms", *IEEE* (Aug. 1988) pp. 56–66.

Shalom Tsur, "Deductive Databases in Action", *ACM* (Sep. 1991) pp. 142–153.

Malcolm C. Harrison and Norman Rubin, "Another Generalization of Resolution", *ACM* (Jul. 1978) pp. 341–351.

Michael Allen Bickel, "Automatic Correction to Misspelled Names: A Fourth-Generation Language Approach", *ACM* vol. 30, No. 3, (Mar. 1987) pp. 224–228.

Y. Richard Wang and Stuart E. Madnick, "The Inter-Database Instance Identification Problem in Integrating Autonomous Systems", *IEEE* (1989) pp. 46–55.

R. L. Graham, "Bounds on Multiprocessing Timing Anomalies", *SIAM J. Appl. Math.* vol. 17 No. 2 (Mar. 1969) pp. 416–429.

Witold Litwin and Abdelaziz Abdellatif, "Multidatabase Interoperability" *IEEE* (Dec. 1986) pp. 10–18.

Linda G. Demichiel, "Resolving Database Incompatibility: An Approach to Performing Relational Operations over Mismatched Domains" *IEEE* (Dec. 1989) pp. 485–493.

Rui Feng Zhu and Tadao Takaoka, "A Technique for Two-Dimensional Pattern Matching", *ACM* vol. 32 No. 9, (Sep. 1989) pp. 1110–1120.

Ricardo Baeza-Yates and Gaston H. Gonnet, "A New Approach to Text Searching", *Communications of the ACM* vol. 35, No. 10, (Oct. 1992) pp. 74–82.

Sun Wu and Udi Manber, "Fast Text Searching Allowing Errors", *Communications of the ACM* vol. 35, No. 10, (Oct. 1992) pp. 83–91.

Jeffrey E. Kotteman, Michael D. Gordon and Jack W. Stott, "A Storage and Access Manager for Ill-Structured Data", *Communications of the ACM*, vol. 34, No. 8, (Aug. 1991) pp. 94–102.

Mark L. Gillenson, "The Duality of Database Structures and Design Techniques", *Communications of the ACM*, vol. 30, No. 12, (Dec. 1987), pp. 1056–1065.

Richard H. Lathrop, Teresa A. Webster, and Temple F. Smith, "Ariadne: Pattern-Directed Inference and Hierarchical Abstraction in Protein Structure Recognition", *Communications of the ACM* vol. 30, No. 11 (Nov. 1987) pp. 909–921.

David J. DeWitt, Jeffrey F. Naughton, Donovan A. Schneider, "An Evaluation of Non-Equijion Agorithms", *Proceedings of the 17th International Conference on Very Large Data Bases*, (Sep. 1991) pp. 443–452.

Jun'ichi Higashino, Hiromichi Fujisawa, Yasuaki Nakano and Masakazu Ejiri, "A Knowledge-Based Segmentation Method for Document Understanding," *IEEE* (Apr. 1986), pp. 745–748.

Wong, K.Y., Casey, R.G. and Wahl, F.M., "Document Analysis System," *IBM J. Res. Develop.*, vol. 26, No. 6, Nov. 1982.

E. Meynieux, S. Seisen and K. Tombre, "Bilevel Information Recognition and Coding in Office Paper Documents," *IEEE* (Apr. 1986), pp. 442–445.

NCR, White Paper Series Presenting the Issue to Consider Before Implementing Imaging Technology, *Issues in Imaging #1–#11*.

METHOD AND APPARATUS FOR IMAGING, IMAGE PROCESSING AND DATA COMPRESSION

This application is a Continuation-in-Part of copending U.S. patent application Ser. No. 08/224,273, filed Apr. 7, 1994.

FIELD OF THE INVENTION

The present invention relates to the field of methods and apparatus for automated image processing, image compression and pattern recognition, as well document-image storage and retrieval, and more particularly the field of systems for financial instrument processing in a manner that provides for efficient storage and retrieval of check image information and the detection of fraudulent and authentic instruments.

BACKGROUND OF THE INVENTION

In commercial and savings banking practice, monetary transfers often involve documents that include standard, preprinted information (backgrounds, logo's, icons, repetitive patterns, fields and the like) as well as post-printed information (handwritten entries, names, addresses and the like) that render the item negotiable or representative of a legal, binding contract. These documents are thus forms with added information. Such items include, e.g., checks, deposit and withdrawal slips, coupons, travelers' cheques, letters of credit, monetary instruments, food stamps, insurance forms, title documents, official government forms, tax forms, medical forms, real estate forms, inventory forms, brochures, information forms, application forms, questionnaire forms, laboratory data forms and the like. It is generally desirable to automatically extract relevant information from a form in order to assist in the processing of that information.

A check is a negotiable instrument, which is signed by the maker or drawer, indicates a sum certain of money (or other specified value), a date to pay, and a direction to a bank or financial institution to pay to the order of the payee or to bearer on demand. The check thus generally has certain information or indications preprinted on it, information which is added to customize the check for the drawer and the payor bank, and information unique to each check written. In order for the bank to pay on the item, a check is generally first endorsed on the reverse side upon tender. Processing institutions in the international banking collection and settlement process will typically each stamp the check with identifying information, and also provide status relating to dishonor or abnormal circumstances. In normal banking procedures, the paper check passes from the maker or drawer to the payee, who then deposits the check with the payee bank. The paper check is then cleared, for example, through a central clearinghouse of one or more banks, and is sent to the payor bank. While the funds themselves typically do not, in a physical sense, pass hands, but rather are indicated electronically on daily balance sheets, the document itself, under strictures of law and custom which originated hundreds of years ago, actually passes and is returned to the maker. Electronic funds transfers are also available, but these transfers do not necessarily require a written authorization granted to the recipient of the funds, and thus do not pose the same paper handling problems.

Accordingly, in the area of check clearance, and, as well, with respect to the other instruments and documents identified above, the physical document, its possession and transfer are important, since the funds are withdrawn from the drawer or maker's account while the check is returned to the maker or drawer. Thus, the paper check must generally be physically transferred through the banking system.

The check typically originates from a printing house and contains customary preprinted information that is identical from one check of a given style to the next. The check becomes a legally operative document upon the inclusion of handwritten or post-printed information, which also renders the document unique and provides for its special place in the collection process.

The originator of the check transmits the check to a point of collection (e.g., a lock-box operation that handles bulk mailings, or to the payee directly). The relevant information is verified by the payee and the check is endorsed and delivered to the bank for deposit to an account. At this point in the process, electronic notation of the transaction is performed, while the paper media is physically collected and sent through a clearing system. The paper check is then sorted and prepared for delivery to the originator's bank. The electronic information is used to net out and transfer funds between banks by the clearinghouse system. The paper check is then sent to the originator bank for sorting, debiting customer accounts (originator), microfilming, envelope stuffing and final delivery back by mail to the originator. Errors can and do occur at every stage of the process. An error may result in a liability which equals or exceeds that value of the transaction, as well as subject the maker of the error to regulatory sanctions. Thus, only a very low error rate is tolerated.

In today's world, it is sometimes inconceivable that the cash itself never passes hands but can be electronically transferred or exchanged, while the document underlying the transfer must move from one bank to the next and cannot be electronically transferred. While this may not be the case for electronic funds transfers (which are controlled by special legislation and do not typically involve the use of checks), clearly check transfer processes are antiquated and cannot utilize the wealth of electronic data transfer mechanisms unless the integrity of the paper itself is maintained. Thus, any system which is employed to improve the efficiency of the check handling and clearing process should maintain the integrity of the information to legal standards, and also meet customer's demands for reliability, efficiency and acceptability.

In 1988 the Board of Governors of the Federal Reserve System stated that "the benefits of a nationwide electronic presentment system would not be sufficient to outweigh the costs of a nationwide system". Furthermore, the Board recommended, that the focus of such a system should be on image processing to expedite moving the payment through the system. It was made clear that by the use of image interchange, the operational and transportational expenses would be greatly reduced. Likewise, through truncation processing, the amount of stored and transmitted information can be minimized. Thus, the benefits of a check truncation system are clearly taught in the art. However, past analyses have indicated that such systems are expensive. While the use of truncation processing can minimize the information to be transmitted and stored, past systems have generated a relatively large file for each document so processed, so that this burden is not considered trivial.

It is known in the art of digital data storage and compression to compress data by compiling code libraries of information in a digital data source file, with a code library derived from the data to be compressed or with a code library having a content based on a predicted likely information content of the source file, resulting in a compressed file if the source file is represented as a series of pointers to portions of the code library, when the code library contains enough sequences in common with the source file. Thus, the series of pointers to the code library can be represented by a smaller information content signal than the data source file itself. Further, it is known that such code libraries may be adaptive and updated to include information from a digital data source file, which may be repeated elsewhere, thereby effecting a lower data storage requirement. Code libraries may also be purged of information which does not appear in files to be compressed. A limited size code library offers two advantages: first, it limits the search time to match a sequence in the source file with a sequence in the code library; and second, it limits the size of an individual pointer and therefore allows the compiled series of pointers to have an optimum length.

A match between a stored template and a scanned image is rarely exact, e.g. because of noise introduced when scanning or skew of the scanned image that may have been introduced when handling the paper document. This is so even when the template is only a portion of the input image or even when the match is based on features rather than pixel values. Consequently, a frequent method of matching a template is done by using a distance measure, $d(m,n)$, between the template and the image at all points in the image field. The input image is deemed to be a match whenever the distance is less than a preestablished threshold (A). The distance function $D(m,n,I,T)$ is computed at a variable starting point in the input image I against template image T. Because of the skew or noise, the search of the input image may be at some localized area for a matching template.

Thus, $I(j,k)$ can denote the input image to be searched and $(T(j,k)$ the template image sought, where the search is constrained over some region of $I(m,n)$, of the image where $0 \leq m \leq M$ and $0 \leq n \leq N$, for example. The pixels are then index points of the image as a range over a matrix. By way of example, the index can start at the lower left most pixel of an image as the position (0,0) in a typical coordinate system. One common distance function used is where the difference is defined as: $D(m,n,I,T)=\Sigma_j\Sigma_k[I(j+m,K+m)-T(j,K)]^2$. A template match exists at coordinate location (m,n) if: $D(m,n,I,T)<\lambda$.

Since many templates exist in the database, B(I) is donated as the closest matching template for a database of templates, $F=\{x\}$ where x is a template} and is defined as $B(I)=x$, where $x \in F$, and $D(m,n,I,x)$ is a minimum. The matching of the templates is complicated by a number of problems, e.g. shifts, rotational differences or scale differences, when pixel-by-pixel processing is necessary. It is therefore often important to spatially register the two images to correct for these problems. Many techniques are known in the art that deal with image registration. Such techniques improve upon the template matching process.

A number of image matching techniques are known and used in the art. Generally, these fall into three categories:
1) Correlation approach—a traditional approach encompassing signal processing and statistical decision theory concepts.
2) Feature matching approach—whereby pixel-by-pixel intensity variations are ignored in favor of selected measurable features or attributes and relations of an image, e.g. texture or color.
3) Relational matching—where detailed correspondences between the images include geometric relationships between selected components. This provides for modelling of an entire image and leads to more efficient further processing by being able to prioritize the landmarks depending upon their particular semantic significance. See Pratt, W. K., *Digital Image Processing* and Fischler, M. & Firschein, O. *Intelligence, The Eye, The Brain and The Computer* for more information on image matching techniques.

When features are used as a means for matching, various codebooks can be created, each with its own set of features. Thus, the algorithm can choose a codebook depending upon the features of the document and therefore dramatically reduce the search time.

Model-based data compression is also a known concept. In a model-based compression system, certain characteristics of the data to be compressed are presumed or predicted. In a model-based system, ordinarily, an expert studies the characteristics of the type of data, and designs a codebook optimized for the expected data. The information content of the data may be substantially reduced by taking into consideration these characteristics common to a significant portion of the data stream. Therefore, in such a system, it is the difference between the data signal to be compressed and the model or a selected model encompassed by the system which forms the relevant data to be further processed. Of course, if a model completely describes the source data, then the compressed data consists of merely an identification of the model. Various methods are also known to account for deviations from the model which are insignificant, without substantially increasing the amount of information which is necessary in order to describe the source data. Therefore, a model-based system may include one or more models which characterize prototypic data, and an unknown signal is then matched to a selected model, and processed to eliminate information included in the selected model.

It is further known that a large number of images or compressed images may be stored in a storage device. These images may be used as templates for a pattern recognition system, for matching an unknown pattern against the images in the database. The storage medium may be RAM, ROM, EPROM, EEPROM, flash memory, magnetic storage medium, magneto-optic storage medium, digital optical storage medium, holographic image storage medium, an optical storage medium and other known systems. The images stored in these databases may provide a very large number of templates or models against which an image or data pattern is to be matched, and statistical analysis may be used to select a best match.

Automated handwriting extraction from documents and recognition thereof is also known. Handwriting recognition may be used for computer information input. Known optical character recognition systems are available to read and interpret handwriting. Systems are also available to extract handwritten information from electronic images of forms.

SUMMARY AND OBJECTS OF THE INVENTION

The foregoing and other objects of the invention are achieved herein by a system and method for processing images in the form of, e.g. a financial or standardized type of document, comprising: the steps of scanning the image to create a first digital image of the document; comparing the first digital image against a codebook of stored digital images, or features of an image, or information relating objects in an image; matching the first digital image with one of the stored digital images, or features of an image, or information relating objects in an image; producing an index code identifying the stored digital image as having matched the first digital image; subtracting, or filtering or deleting the stored digital image from the first digital image to produce a second digital image; and storing the second digital image with the index code.

More particularly, one aspect of the invention comprises optically scanning personal or corporate checks to produce a digital signal and converting the data, through a model-based or other compression algorithm, to produce a significantly smaller data file, thus reducing the amount of memory needed from, e.g., about one megabit per check to only a few hundred bytes per check.

A standard personal check measures approximately 36 square inches, while corporate checks can vary, for example, from about 20 to 60 square inches. A simple approach to scanning with high resolution (600×600 dpi) can therefore lead to an image requiring a minimum of one megabit of information per check. The present system, however, employs a model-based image analysis and compression system, which separates and extracts a variable foreground portion of the check from a form or background portion of the check, matches the form portion with one of a plurality of stored templates to allow substantial compression by representing the background as merely a simple identifying code. The system optionally determines an error between the matched stored template, determines whether the error is not significant, and ignores the error if it is insignificant and subjects the check image to further processing if the error is significant. The foreground image, separated from the background image and compensated for error, is further subjected to an optimal compression adapted to the particular type of information, e.g. handwritten or printed. Alternatively, the invention also comprises a method that does not involve a first determination of form portion and variable portion (or background and foreground) but rather seeks the existence of a match with the template, using an algorithm which is tolerant to the existence of a variable portion. Either way, the compressed information according to the present invention will have an information content significantly smaller than the original, complete scanned image, which can be, e.g., about a few hundred bytes, or less.

The standard check image compression systems heretofore known, however, produce files having an information content of at least about 40 kilobytes or more at a lower resolution than 600 dpi.

By processing the checks early in the chain of collection events, while extracting all of the necessary information from the check, the present system eliminates the requirement of physically sending the paper check from place to place after conversion, reducing the possibility of errors at the various subsequent points. Therefore, once a check is properly scanned and the integrity of the data ensured, the paper original may be destroyed or, at a minimum, may be stored remotely from the location of the collection and settlement process. In fact, under the present invention, the stored compressed digital image can, and should replace the paper check, and therefore the paper check can be eliminated entirely thereby preventing fraud through duplicate processing or doctoring of paper media.

The present system therefore allows the "truncation" of a paper check into an electronic image form. This allows the transfer of reliable and secure information between the various parties without need for the physical transfer of paper. Security of the digital data may be ensured by various encryption methods, e.g. public key/private key systems, digital signature standard, digital encryption standard and other known secure encryption systems. The electronic message may also be time stamped. The paper check may be truncated at any of a number of points in the processing chain. The check may be truncated by the payee, through use of a device which, in a secure and reliable manner, scans the check image and destroys or permanently defaces (or stores remotely) the original. In a lock box operation, where the payee has an agent to collect payments and process them, the operator of the lock box operation may also truncate the checks, and transmit the information to the appropriate financial institution, as well as the contracted party or any other interested party. The check may also be truncated at the payee's bank, where the payee presents the check for deposit. In this case, the security is less important, although the integrity of the system depends on a fail-safe system. The central clearinghouse may truncate the paper check, either before or after processing. This clearinghouse may also include a special check truncation unit, as a function thereof, and the truncation need not be a part of the existing clearinghouse infrastructure. The payor's bank may also truncate the check, although some of the advantages provided by aspects of the present invention may not be fully achieved. Finally, the payor may truncate the check saving substantially the cost of mailing back the checks to the originator.

The memory reduction facilitated by the present invention is done by separating the background of the check, i.e. the check style information, from the personalized, foreground information, i.e. the handwritten, post-printed or added portion. In some cases the background information may include preprinted signatures or other identifying information, e.g. corporate or private names and addresses. Once the background information is determined or defined, it is maintained in a library and only an index code associated with that background need be maintained with the foreground, personalized information to represent a check image. The background can then be deleted or eliminated from the stored check information (except for the identifying code), thus reducing the amount of memory required. In some cases the identifying code may be represented implicitly, therefore eliminating it entirely from the stored information. Thus, the invention includes, as a feature, the creation and maintenance of a codebook library of scanned check information, in a suitable storage form, e.g. actual image or compressed image data of various resolutions, that can be used to regenerate the actual image data, through the use of an algorithm executed by a computer or a series of mathematical equations that can compare the features and relationships (e.g. geometric) between the codebook and the actual regenerated image. Where the code has been eliminated and is only implicit within the rest of the stored image, the computer algorithm can regenerate the actual image through this implicit knowledge. By way of example, if the issuing bank only uses one background for all their checks, by the algorithm knowing the issuing bank, the algorithm implicitly knows the background without need of a code.

The present system also includes a system for positively identifying the background image of a check through a code contained thereon, which may be a zebra code, bar code, two-dimensional code, numeric or alphanumeric code, invisible optically readable code, or magnetic readable code. This code allows the easy access of a corresponding image of a blank check form from a storage medium, which allows easier identification of the added information on the foreground through image subtraction, and provides positive identification of the check style. While it is not necessary to provide the image stored in a database, providing such an image will allow the verification of the image code and allow the identification of forgeries and frauds. The preferred storage medium, where a search of the entire database to determine the existence of a match is CD-ROM, which allows the cost effective storage and updating of a large number of check forms.

When a background subtraction of a check form is accurate, the remaining information on the check may be compressed to about, e.g. 1,000–2,000 bytes of information or possibly smaller depending upon the amount of foreground information. Further, if a model-based algorithm is employed on the added information, such as splines or wavelets representation of the handwritten or an optimized compression of the post-printed information, only a small amount of information, e.g. the spline control points need to be stored, and the entire check may be represented diminimously, as, for example, a few hundred bytes of information. See *Three Dimensional Graphics*, Chapter 21, "Curves and Surfaces", pp. 309–330.

When identifying coding of the checks is not available, a pattern recognition system can be employed according to the present invention to match the background image of a check being processed with a database of available images of check backgrounds. In such an instance, it is preferred that the image being analyzed be preprocessed, i.e. subjected to an early stage analysis, to determine certain characteristics thereof. The images in the database are indexed according to similar or identical characteristics or criteria. Therefore, early in the processing of a check, it is possible to define a subset of the database which possess corresponding characteristics to the check. This preliminary matching procedure may be conducted for a number of different characteristics, and may be conducted in parallel by a number of processing units. Thus, a small subset of the overall database of templates, having characteristics closely matching the check being processed, may be defined for further processing. It is preferred that only a small number of images be retrieved from the database for direct comparison or cross correlation with the check image, because of the need to maintain high throughput and because of the high computational expense of the image pattern matching operation. In order to keep the size of the database to reasonable proportions, a compressed version of the image may be maintained. When the compressed image is retrieved, some preprocessing may need to be done to decompress the image before attempting to compare or cross correlate it to the check image.

The system according to the present invention preferably employs to full advantage any clues provided on the check as to the identity of the form, such as the preprinted codes referred to above, an identification of the manufacturer of the check, information relating to the manufacturing or printing process employed in making the check, and other information that may limit the available choices of check type, e.g. account number or customer identification that may be associated with check types that is typically used by that customer as may be learned by a computer system. Further, the processing is preferably time limited, so that after a predetermined period of time, the matching processing ceases and the check is represented as a compressed image based on the image data and the processing performed in the matching process. If the processing is prematurely terminated, that check may optionally be later processed by an exception handling system. Further, in cases of an incomplete match, a check may be described by its relation to other templates or portions of templates in the database, which may be described in a smaller number of bytes than a non-model based de novo description. In addition, a check image may also be described in relation to combinations of transforms applied to defined patterns or portions of other available images in the database.

Many checks have a repetitive texture or pattern in the background region. These repetitive background patterns lend themselves to efficient compression and/or analysis using Fourier coefficients, wavelets, fractal (iterated function system) transforms, and/or spatial pattern analysis. Such processing is expected to greatly reduce the amount of relevant data, while retaining information necessary for reconstructing the check image, even if a full background template matching function is not completed on the check.

The present system for scanning checks may be advantageously employed with a fraud detection system. The scanner preferably has a high resolution, e.g. between 300–800 dpi to produce resultant images of very high quality. Certain new check styles include finely printed information in, e.g. 1 point type, which cannot be scanned using normal scanning equipment, for the purpose of preventing electronic copies or forgeries. The present system may scan the entire image at extremely high resolution, in order to properly detect this information. After data compression, the results of such a high resolution scanning system will be small. Subtle variations and "flaws" may thus be detected in the check background. Therefore, if such flaws are intentionally placed by the manufacturer, the image contained on the database could include an identification of these "flaws", which would be searched for on the checks being scanned. Thus, a match would also determine the authenticity of the check form, thereby thwarting certain types of frauds. Likewise, any checks which are scanned are analyzed for the presence of artifacts not present on authentic documents. These may be present due to falsification of the document. Therefore, the present system may assist banks in detecting and preventing fraudulent transfers. It is noted that certain kinds of flaws may only reasonably be detected through an electronic analysis, and therefore the present system allows new, enhanced methods for ensuring the integrity of the system.

The present system preferably analyzes the foreground information on a check in order to ensure the availability and consistency of necessary information on the check prior to passing through the check clearing process. Thus, missing information may easily be detected. Further, inconsistency between the courtesy figure (e.g. dollar amount in decimal) and written amount on the check may be detected.

The prior art teaches the sorting and searching of databases. See Gotlieb & Gotlieb, *Data Types and Structures*, Chapter 4, 97–155, Prentice-Hall (1978).

Prior art teaches parallel processing and parallel operations. See U.S. Pat. No. 4,860,201, Binary Tree Processor and U.S. Pat. No. 4,843,540, Parallel Processing System, both to Salvatore J. Stolfo.

It is thus an object of the invention to create a system, method and apparatus for creating and using a codebook of data images or features or relationships of financial instruments or standardized documents, scanning a negotiable or other instrument, producing an image, comparing the scanned image against the codebook, subtracting the codebook image information from the scanned image, compressing the left over handwritten or post-printed information, and taking the final reduced product and storing and/or processing same in accordance with banking procedures.

It is also an object of the invention to employ parallel processing techniques to accelerate the processing of an individual matching operation, comparison of an unknown object against a set of codebook templates in parallel, and the processing of a multiplicity of unknown images in parallel.

It is a further object of the present invention to substantially reduce the storage requirements and management of large archival storage of many check images and to improve the speed of accessing and retrieving individual check images and the long term storage requirements of older existing microfilmed check images, which are typically maintained by the banking system for about 7 years.

It is another object of the present invention to provide variable-size or scaled check images retained on storage media, including decompression by utilizing codebook code to render full color and faithful reproductions of archived check images.

Further objects and features of the invention will become apparent from a review of the figures and detailed description of the preferred embodiments, set forth below.

BRIEF DESCRIPTION OF THE DRAWINGS

The preferred embodiments will be explained by way of the drawings, wherein.

DETAILED DESCRIPTION OF THE PREFERRED EMBODIMENTS

Figure 1:
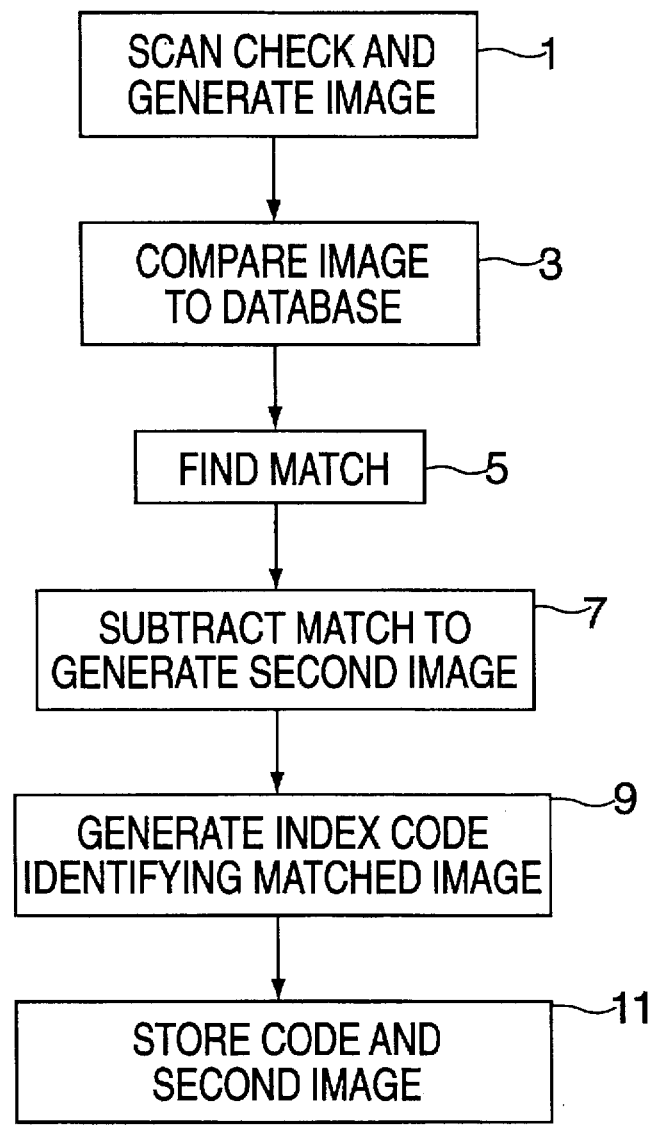
FIG. 1 is a flow diagram of an overall methodology of a system operation in accordance with a first embodiment of the invention.

In FIG. 1, the overall system architecture of logic is set forth in accordance with a preferred embodiment of the present invention. Box 1 sets forth the first stage of the process, wherein the check (or other document or instrument, as the case may be) is scanned and a scanned image, reflecting the check, is created and stored. It is understood that any of a number of known hardware scanners can be utilized for this purpose, and any of a number of known software packages can be used to scan and store the scanned information. A preferred scanner has a resolution of 600×600 dpi, 6 to 8 bits of gray scale or 18–24 bits of color information, with a selectively engageable increased resolution mode of around 2400×2400 dpi or higher for areas of increased detail. The increased resolution mode is employed when high resolution detail is expected in a portion of the image, as predicted by a matched template or model, and for capture of, e.g., the signature. Thus, the high resolution selective scanning may be performed as a post-template matching operation, preferably using different scanning hardware. As a consequence of the limitations of current technology, such high resolution is not used to capture the entire image because of the large amount of data which would be produced, and because of the slow speed, decreased reliability and sensitivity to artifacts of such scanners. As technology improves, it is presumed that the application of such technology will be included within the scope of the present invention. It should be appreciated that the techniques according to the present invention have are independent of the resolution of the scanner and reproduction device, and can employ the most currently available technology based on the application demand.

Further, after enough scanning 1 is completed for an image to be recognized, comparing 3 is next initiated wherein the image resulting from scanning 1 is compared against a codebook database, and a match 5 is found. By matching, it is understood that a mathematically significant overlap in image between the scanned image and the stored image is sought. In other words, identity is not necessarily required in order for the match to occur, but rather known techniques can be used to determine a best match. A match will be considered so long as the pixel range between the scanned image and the stored image is within some threshold lambda ($\lambda$). Of course, the matching system may also compensate for possible transforms, such as slight stretching, skewing, bowing or other alterations which would prevent an absolute match yet are possible under normal circumstances. A check image which can be matched, yet contains a significant difference from the template is handled by an exception handler, possibly in a separate operation. Such exceptions, expected to be rare occurrences, may be considered manually, or be subjected to more extensive automated scrutiny.

Alternatively, matching can be performed by computing some feature of a patch or portion of the unknown image, and then matching this extracted feature against a codebook of templates. The templates themselves represent features and any other identifying information to allow for matching. An image feature is a defining characteristic of an image, which therefore may define different or distinguishing image types. Alternatively, one may design a plurality of distinguishing features of an image, each with some appropriately defined identifier, like an image type and at least one feature. The plurality of such features may be represented as a structured record associated with an image. Matching may be performed on this record of features or a portion thereof. Accordingly, the invention teaches the creation of a database having a plurality of records, wherein each record has unique elements comprising an identifying code and a collection of identifiers that distinguishes one record from another. Thus, the image type and feature can be compared against the identifying code and collection of identifiers in the database.

By way of example: natural features would correspond to certain obvious characteristics that a viewer of the image would recognize, e.g. color, grain, etc. Artificial features would be the result of a mathematical manipulation of the image, e.g. histograms of pixel luminance, amplitudes, and frequency spectra in some spatial region.

The matched codebook data image is next subtracted (subtract match 7 in FIG. 1) from the scanned image. By subtraction, it is understood that any of a number of techniques can be used to filter or compress the amount of information that comprises the stored image, and need not actually involve full, and complete arithmetic subtraction. Further, the separation of the codebook data image from the scanned image may be totally separate from the codebook matching operation. For example, if a check background is light blue with a darker blue pattern, then the background may be separated by means of a simple color filter which is not dependent on the background pattern. Further, preprinted information may also be separated in like manner, by filtering for straight lines and other expected features or objects on a check.

Thereafter, a code is generated in element 9 identifying the matched image in the codebook. By generated, it is understood that within the codebook each stored template is represented by a code, which uniquely identifies the template. This code may be a binary integer or other type of index.

After matching the scanned image with a stored image, the separated foreground image information is stored linked to the codebook identifier of the separated background image. In this manner, the entire, original scanned image can be reproduced, while the storage of this image is significantly reduced in spacial, storage requirements. The foreground image preferably undergoes further processing in order to reduce the information storage capacity necessary. This compression may be performed by further reference to a codebook, for printed information, or by other types of image compression for e.g. the handwritten information. All of the information contained in the check image is stored in linked fashion, which may be physically adjacent, or otherwise mathematically related.

Figure 2:
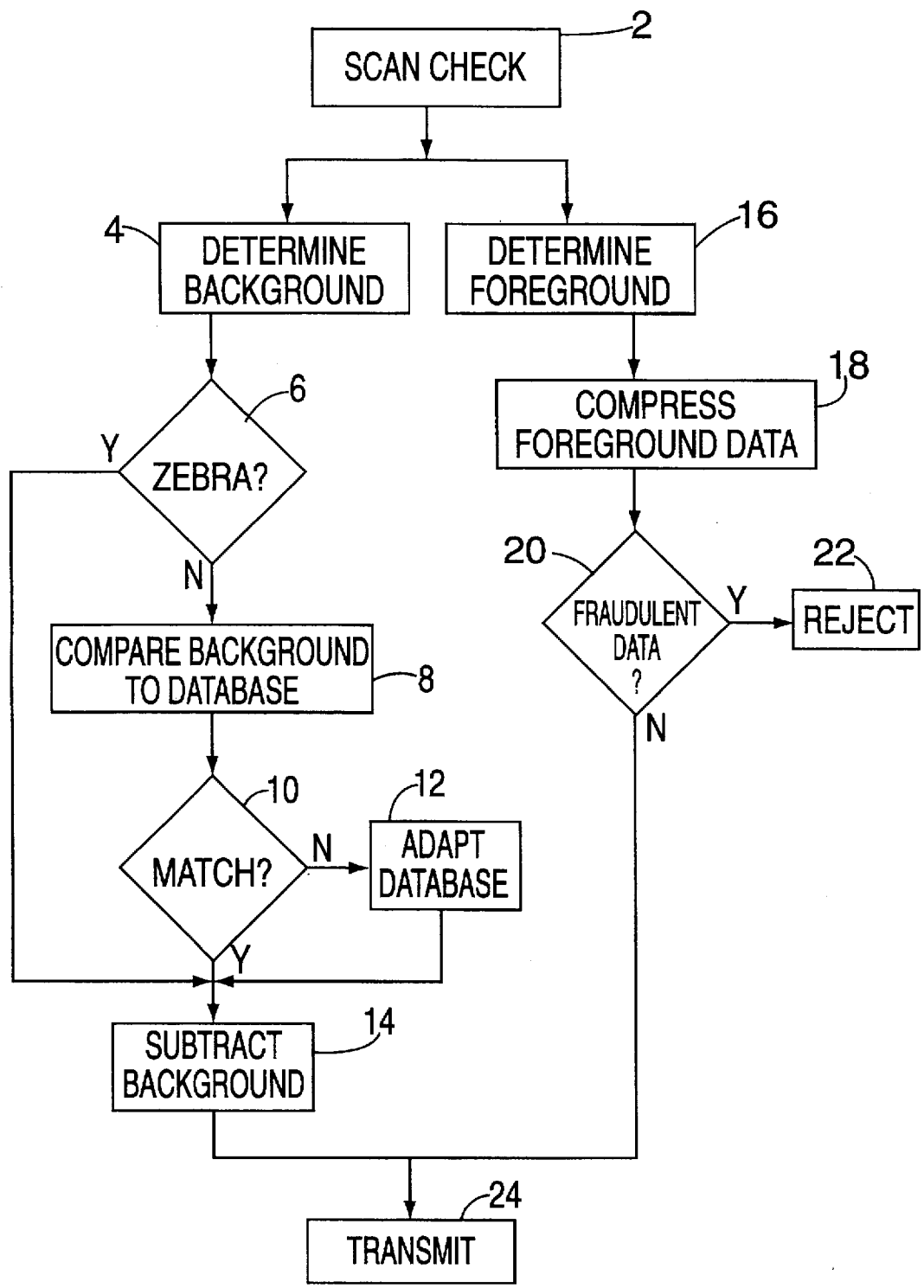
FIG. 2 is another flow diagram of an overall methodology in accordance with a second embodiment of the invention.
Figure 3:
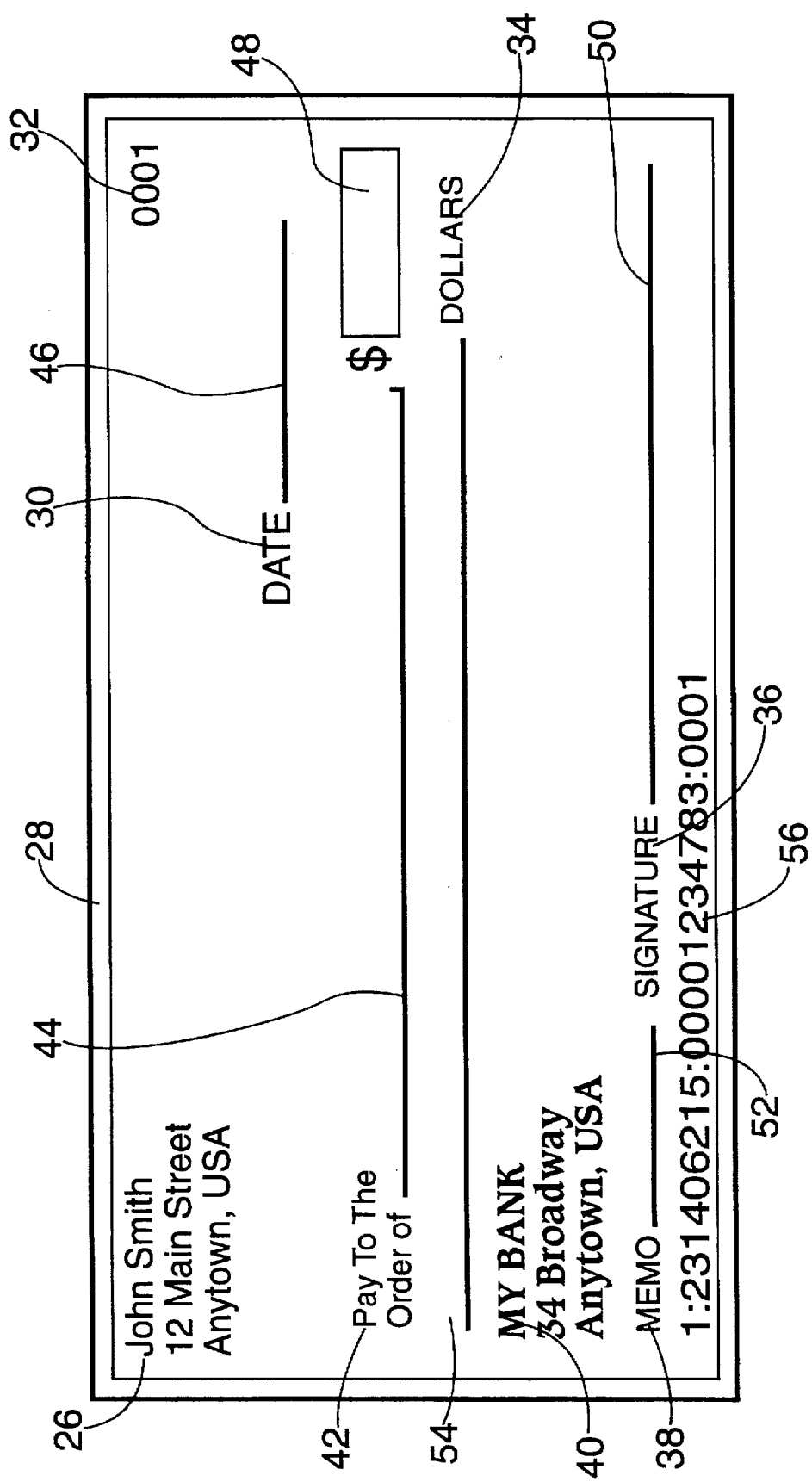
FIG. 3 is a layout diagram of a typical check containing preprinted information.
Figure 4:
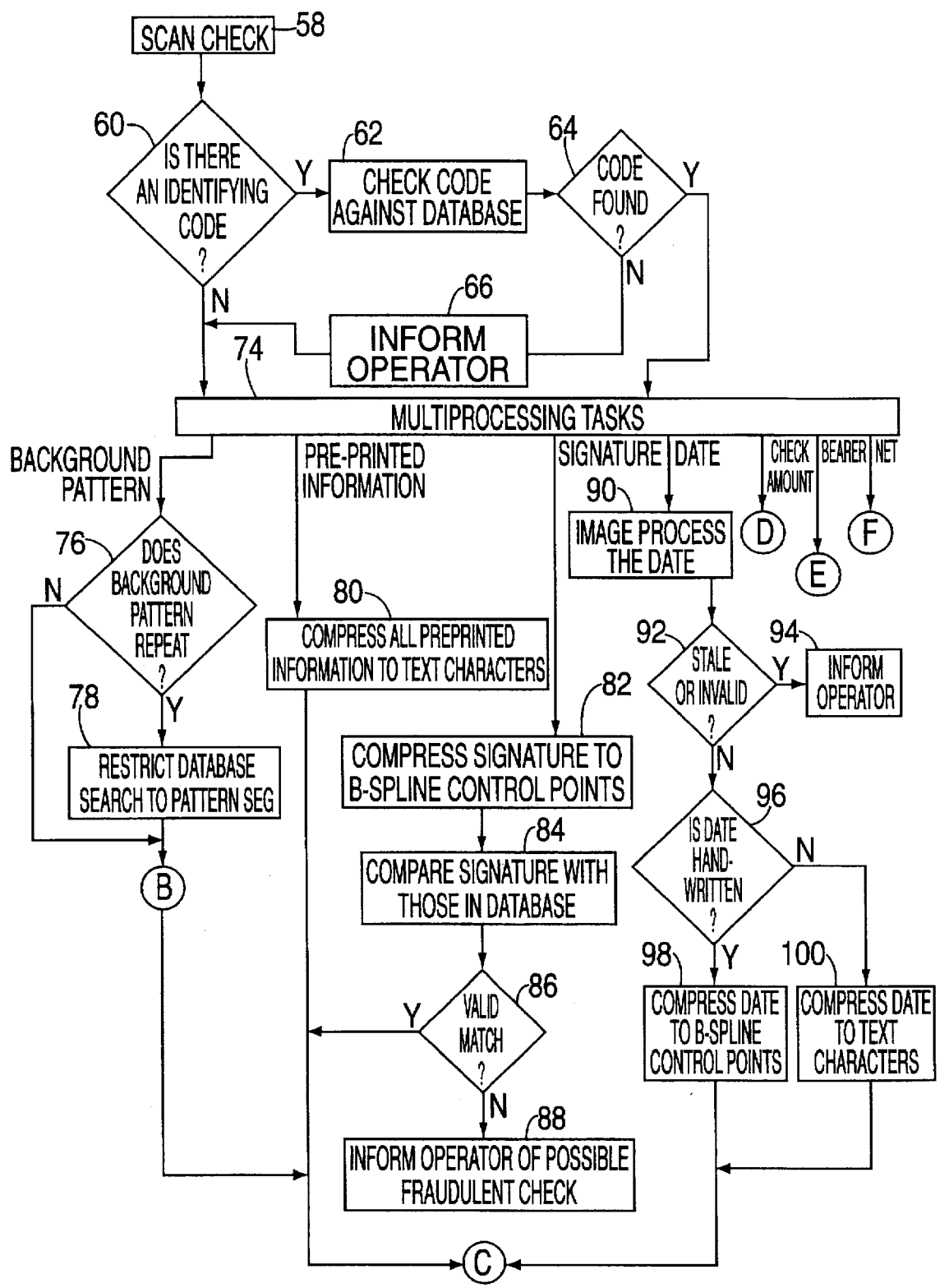
FIG. 4 is a detailed flow diagram of the embodiment set forth in FIG. 2.
Figure 5:
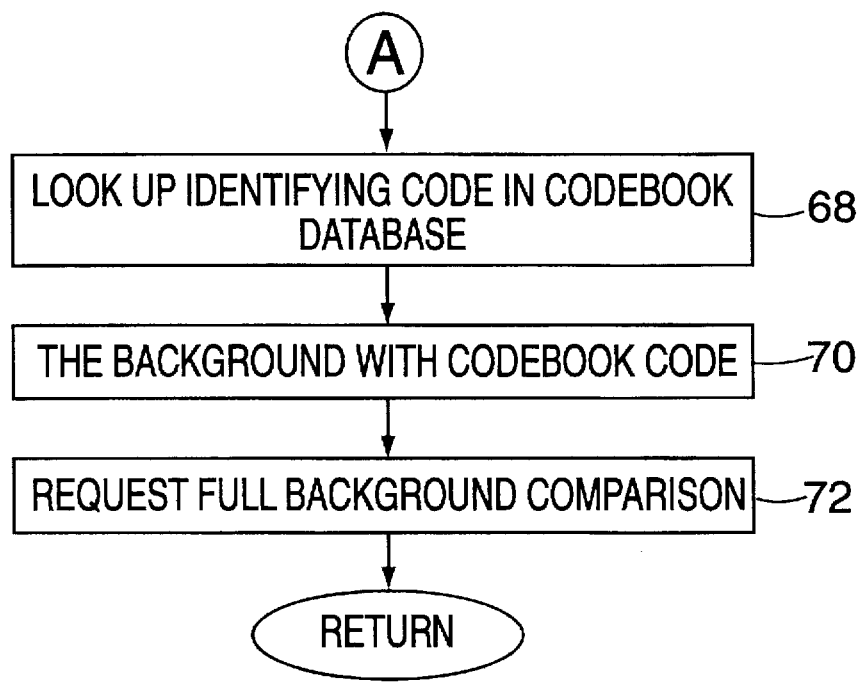
FIG. 5 is a sub-flow diagram of the portion "A" of the flow diagram of FIG. 4.
Figure 6:
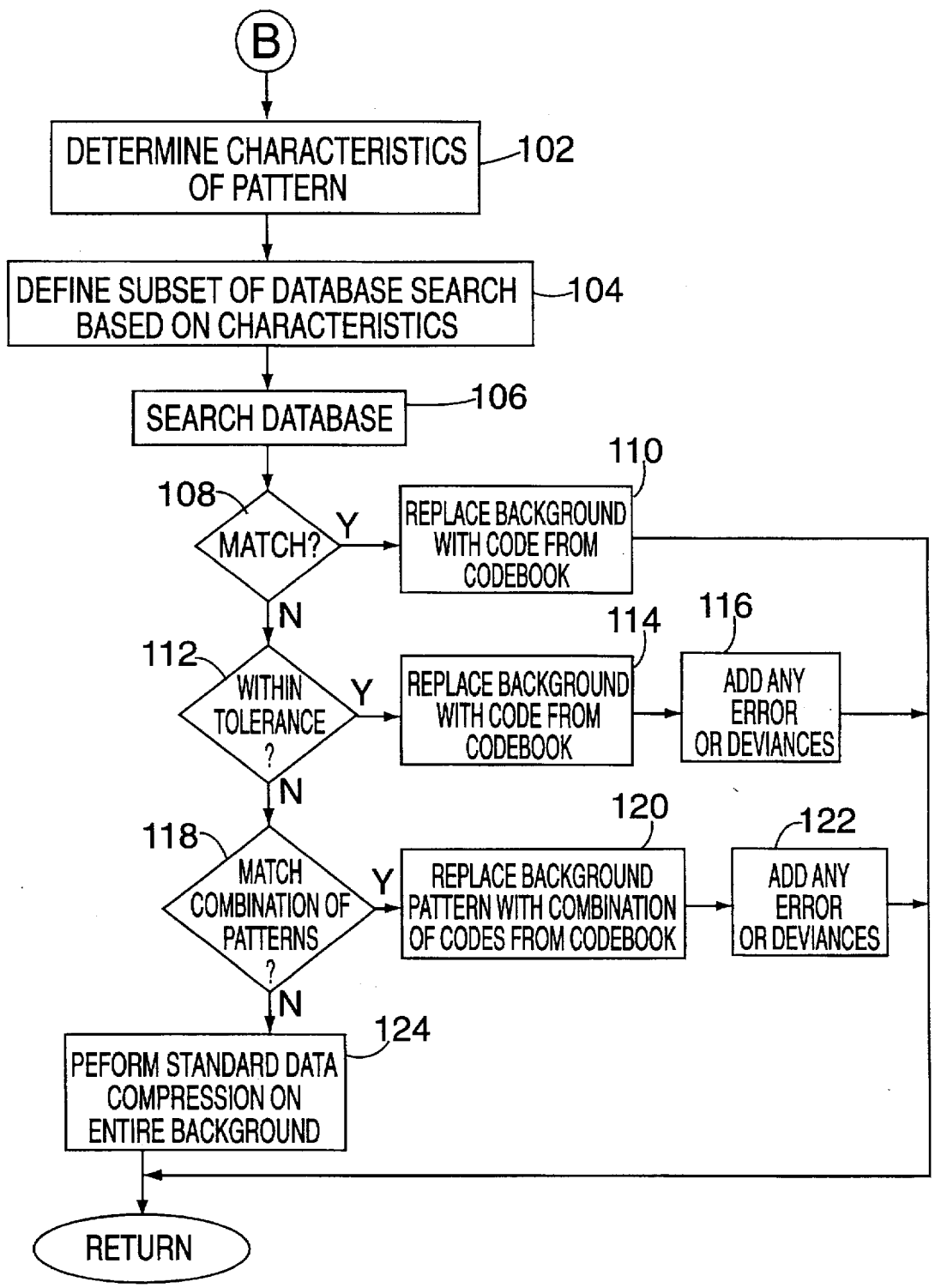
FIG. 6 is a sub-flow diagram of the portion "B" of the flow diagram of FIG. 4.

FIG. 2 shows an alternative embodiment of the invention. The maker's check is scanned in by a scanning device 2, which may be a commercially available device for the purpose, and converted into a digital image stored in the processor's memory. The processor first scans the check image for the presence of an identifying code which uniquely identifies the check form and/or preprinted information on the check. The preferred code is a zebra code or two dimensional code. Optionally, the foreground image may be first separated from the background using standard image processing techniques before the code detection occurs. In such a case, the processor divides the check image into various regions, which may be overlapping, and begins to look at the various regions of the scanned image. The processor then separates the foreground from the background in the region of the image which it is processing. On a pixel-by-pixel or cluster of pixels level, the processor determines whether the part of the image that it is currently analyzing is part of the background 4 of the image or of the foreground 16 of the image. When the foreground obscures the background, the processor optionally interpolates the background, or generates a mask of the foreground image which is ignored or processed separately from unobscured background. Determining that the processor is looking at the background, it then checks the image for a zebra code 6 or some other such similar code as set up by the financial industry or check manufacturer. If there is no such code, the processor must compare the background to the database or codebook 8 to ascertain whether the check has a known background. Upon finding a match 10, the processor can subtract the background 14 from the image, replacing it with a code from the library. If the match is not exact, but within a certain range of matches, the background can be subtracted or filtered with the residual differences coded as additional information in the composite compressed image.

If no match is found, the processor preferably takes steps to update the adaptive database 12 to add this new background to the database and create a new code for it. The new background must be transmitted to a central repository so that a receiver of the coded image data may decode the background. Thus, upon encountering a new background which passes exception checks, the image is forwarded to a central clearinghouse for addition of the database and appropriate indexing and processing. This new check background image will be included in an update release of the database. Upon receipt of the new background, the clearinghouse first checks it against its own, more updated, database, and will return an appropriate code to the processor if one has been previously assigned, or assign a new code if none exists. In the absence of feedback, the new check will be stored as a compressed image according to known techniques.

After determining the background code, the processor can subtract off this now known background from the check image 14. If a zebra code was initially found 6, then the background can be immediately identified and subtracted off 14 replacing it with the code from the database library.

In the preferred embodiment, simultaneously with the comparison by the processor of the background for a match with templates in the database 8, a determination of a foreground area of the image 16 can be made by standard filtering techniques, with subsequent compression of this portion of the image area 18 using standard compression method techniques selected for this purpose. While the check image is being processed, all of the data of the check must be analyzed to detect indicia of fraud or irregularity. This preferably occurs after the background has been identified, so that the analysis may take into consideration the matched background image. This analysis may take place concurrently or subsequent to other processing of the check. The foreground is checked for any fraudulent indications 20 such as an invalid signature or an improper amount. If any fraudulent indications are found, the check is rejected 22, and is subjected to exception handling, which may include, e.g. notification of the bank operator.

After the background data has been subtracted out and the foreground data has been compressed with no fraudulent indications, the remaining image is then transmitted 24 to either the payor's bank or an intermediary clearinghouse.

In another embodiment, the paper check is written either as a personal check or as a corporate check by the originator and given to the depositor for payment. A personal check is typically 36 square inches, printed on quality non-bonded paper with a weight between 20 and 28 pounds. The size of a corporate check, will range, for example from 20 to 60 square inches of the same quality as the personal check. Typically, the front of the check will have some sort of background pattern, whereas the back of the check may or may not have a pattern. The front pattern may be one of a repeatable nature, of a random configuration, or of a picture. The back of the check will generally have a random or repeatable pattern.

The different parts of a typical check are as annotated: 26 represents the payee's personal information, i.e. name, address, telephone number; 28 is the preprinted border surrounding the check; 30 is the preprinted word "Date"; 32 is the sequential number of the check (same number that is part of the magnetically printed information; 34 is the preprinted word "Dollars"; 36 is the preprinted word "Signature"; 38 is the preprinted word "Notes" or "Memo" or some other such notation indicating that this is the area to write a general comment concerning the nature of the check; 40 is the name and address of the bank that the check is issued against; 42 are the preprinted words "Pay to the Order of"; 44 is where the maker indicates to whom the bearer or depositor of the check is to be; 46 is the area where date of issuance is placed; 48 is the area where the maker writes in the courtesy figure (numerical amount in decimal) of the check; 50 is the area where the maker or makers of the check must sign the check; 52 is the area that the maker or bearer may write any memo or notes as to the nature of the check; 54 is the amount that is to be drawn from the check, written in alpha-numerical symbols; and 56 is the magnetic information of the bank, including the bank code, payor's account number, and check number, printed in OCR font (the so called MICR line). Elements 26 through 42 are all preprinted information supplied by the printing company. Elements 44 through 56 are areas on the check that will be filled in by the maker or bearer of the check. The date 46, courtesy amount 48, and the alpha-numeric check amount 44 can be typed in by the maker, whereas the signature 50 must be handwritten (or a stamp of a handwritten signature). The note or memo area 52 is optional and need not have anything in it. All other foreground areas should be filled in.

The check is then delivered to the depositor's bank for verification and processing. At this point, according to the present invention, the check is scanned into the system for pattern recognition and electronic processing 58. In order to insure completeness and enhance the check fraud detection, both the front and the back of the check need to be scanned in. In addition, the reverse side of the check normally includes the endorsements, which are part of the information which must be captured from the check. Sophisticated imaging systems, e.g. systems incorporating advanced features, are not required for the scanning process. Rather, a standard stand-alone imaging system, including an Intel 486 or Pentium PC, CD-ROM drive (preferably 4x or 6x), with a scanner or "scanning fax" interface. Data communications may be implemented through standard telecommunications interfaces, e.g. v.32, v.32bis, v.34, switched 64 DSU, fractional T1, T1, T3 or ISDN systems. While it is preferred that the check data be completely read in a single pass, in low production environments, the check may permissibly be scanned into the system multiple times to ensure that it is read in correctly. Alternatively, if the check is read in multiple passes, these be performed in series, allowing high throughput. This initial complete imaging is important because once the scanning device determines that the check has been scanned in correctly, the actual paper document may be destroyed, leaving only the scanned image of the check. In fact, it is preferred that once the electronic data is authenticated and verified, the paper check is destroyed, to ensure that the check is only processed once.

Prior to, or after scanning the check, the operator may run a magnetic scanner across the magnetic code 56. This will give the system information such as the issuing bank, bank account number and number of the check.

A preprocessor will look at the scanned image of the check for "zebra" coding or any other type of identifying code on the check in order to identify the background of the check as a particular type 60. This will indicate what the background is and from which printing company or source the check originated. Since the entire image will be scanned in at about 300–600 dpi, the zebra code itself may be made unobtrusive to the naked eye. Further, the zebra code may be printed in a fluorescent or invisible ink, and scanned using a laser or other excitation source. The code is checked against a database of codes from the various banks to determine the type of background 62. Although the database can reside in any number of storage devices, the optimal distribution format for cost and ability to easily and inexpensively update is a CD-ROM.

If the database is stored on a media which requires physical access of stored data, then certain methods may be used to improve the apparent access time over the average or worst case access time. See, Lippman, A. et al., "Coding Image Sequences for Interactive Retrieval", *Communications of the ACM,* 32(7): 852–861 (1989); Yu, C, et al., "Efficient Placement of Audio Data on Optical Disks for Real-Time Applications", *Communications of the ACM,* 32(7): 852–861 (1989). In order to maintain the speed and efficiency of the system, the CD-ROM database must be segmented into various "bands", e.g. groups of database records which are accessible, from a starting position, more efficiently than database records outside the band. Thus, a number of the database records in the band may be accessed in a short period, or one of a predefined group of records need be accessed. The band is preferably a spatially defined region or series of regions of the storage media, but may be interspersed over a large area with an optimization for access based on a parameter other than spatial distance. In a preferred embodiment, a band includes background images or patterns which have similar characteristics, which are to be searched in a particular pattern matching operation. These patterns are stored on a rotating storage (e.g. magnetic, optical or magneto-optical) medium at a range or radii, e.g. on adjacent tracks of the storage drive. This arrangement minimizes read head movement and repositioning during access. Likewise, in semiconductor memory, linked or related information may be stored in the same page frame to increase retrieval efficiency.

If deciphering the bar code or zebra code requires reference to a pattern template database, it is preferred that this database contain information which is banded together for quick and easy access.

In a preferred embodiment, an initial preprocessing of the scanned image determines a characteristic of the scanned image. This characteristic corresponds to a group of check templates representing the subset of check types which possess the given characteristic. Therefore, after the image is processed for a characterization and identification of a first characteristic, a database subset may be defined which includes the possible matches. Of course, the preprocessing may produce an identification of a number of different characteristics, each corresponding to a different subset of the database. This preprocessing preferably occurs without reference to records stored in the database or only to information stored in a cache for fast retrieval. This preprocessing simplifies the pattern matching task which is required to positively identify the check. In the case of a zebra code or other unique check identifier, this preprocessing completes the entire task of identifying the check. However, even an extraction from the check form of the identity of the manufacturer will greatly reduce the computational complexity of the task.

After a database subset of possible matches is defined, the possible matches must be excluded or determined to be true, however the early identification of a true match will, of course, eliminate the need to exclude all others. Therefore, the images should be compared in order of likelihood of a match. This likelihood may be derived from the popularity of a given pattern, either nationally, locally or for a given system, a statistical likelihood of a match based on parameters derived in the preprocessing phase, a linkage of a check type or pattern to a customer's account or other criteria.

It should be noted that in a high throughput system as might be found in a large financial institution, it is preferred that the database access not impede the throughput of the scanning/recognition system, nor that computational resources be under utilized based on a large disparity between peak processing power required and minimum utilized. Thus, after the preprocessing, and during the database access phase, a second check preprocessing operation may be commenced, while the first remains in a queue. Thus, since the storage media access is generally slow, the processor or processor system, which may include a plurality of processors in a symmetric or asymmetric parallel processing array, may divide the check image compression task into a number of segments, each segment to be processed when all of the necessary data is available, yet making the processing resource available to other tasks when the necessary data is unavailable.

It is noted that, in the case of new check types or aberrations, a match will not be possible from a published database. It is therefore preferred that, while the preprocessing and image matching processing is in progress, the check image simultaneously be subject to a compression algorithm that does not require an exact match. This image compression preferably makes use of the results of the intermediate calculations and data structures, if this is efficient, thereby reducing the additional computational load for performing this alternate compression. Thus, the preprocessing characterizations and pattern matching results may also be used to help provide a description of the check sufficient to fully describe the information content thereof, albeit in a manner less efficient than if a code referring to an exact match is found. However, under certain circumstances, a standard compression method may be more efficient than employing intermediate results of the pattern matching algorithm, and therefore is preferably employed. Because of the computational complexity of the pattern matching, and therefore the large amount of processing power which must be available to perform this operation (if zebra codes or other information which simplify the pattern matching task) are not available, the check image may be compressed in a number of ways using these computational resources and the most efficient result, e.g., smallest compressed data file, or alternatively, highest quality image, retained. This image compression preferably occurs simultaneously with the pattern matching, so that a finite limit may be placed on the time for the check processing operation, and therefore a minimum throughput assured. It is preferred that the scanner subsystem be the throughput limiting element, and that a data processing system be employed which assures that the scanner is operating at peak speed. The processing subsystem therefore should be selected in accordance with the scanning speed of the image scanner.

When check styles are uniquely coded, the first step in the identification process is to determine the identity of the code, and look up the code in a database 64. The background can now be tagged with the codebook code from the database 70. If there is a match to the database, a second test may be performed as a background task or as a delayed task. This may be delayed while the necessary information becomes available to the processing subsystem. This second test is to now look up the pattern, represented in the database, based on the code and compare the entire scanned check with the image in the database 72. This is done to ensure that the check that was scanned is not fraudulent in any way, or that the code is not corrupted. This will also allow the printing company to add minor variations to the background pattern that can generally only be seen or deciphered in the scanned image, thereby providing a system for fraud detection and prevention which cooperates with the check processing system. If no codebook entry is found in the database, the operator may be notified 66 that this is a non-standard check, and processed as an exception. As stated above, if the check is nonstandard, yet nevertheless appears genuine according to fraud prevention criteria, then it may be compressed using a standard compression algorithm, as described above. Further, an indication is made which will allow this new check to be included in an image template database update, and to allow consistent coding of this new style.

While this check image matching operation is being processed, the foreground image, which includes the printed information on the check and the added, variable information which is generally handwritten, is processed and compressed. The preprinted information may be subject to the same type of model-based compression as the background image, in particular for constant areas such as borders and designs, while certain portions, such as bank identification, drawer identification, account number and the like may be subject to OCR with identification of the text content and particular font. Finally, the particular information relating to the monetary transfer embodied by the check must also be captured, compressed and preferably analyzed for completeness, inconsistencies, possible indicia of fraud and information content. Handwritten information may be compressed, for example, by modeling the handwriting as a B-spline and storing the control points, which will generally require fewer bits for storage than the raw data. Of course, other compression methods are known in the art.

A preferred processing system includes a parallel or multi-processor system, which may serve as a coprocessor for a standard-type personal computer. The processing system preferably has its own mass storage interface, independent of a mass storage interface of any host processor system. The preferred interface to a mass storage device is a SCSI or SCSI-2 controller, although other types are acceptable. The controller or operating system preferably executes predictive seeks and has a large cache. Further, a slow CD-ROM may be shadowed onto a fast magnetic hard drive.

The foreground processing, many aspects of which may be performed in parallel, proceeds as follows. The processing system performs an image processing operation which separates the foreground from the background image. The foreground image is further decomposed into primitives, such as lines, borders, line graphics, printed text and handwritten text. Each such foreground graphic feature, as it is identified, may be subtracted from the remaining image content 80. Alternatively, a constellation of foreground features that commonly appear together, e.g. postprinted features, may be represented by a code, and thus be represented in highly compressed fashion, proceeding in analogous fashion to the background coding operation. Thus, the system can determine the border 28 that surrounds the check and subtract it off of the scanned image. The foreground processing system can also determine or recognize the bank that issued the check 40 and provide a code for that information. The bank identifying information may then be separated from the remaining foreground image; however it is preferred that the actual image indicating the bank identity be fully characterized in the compressed image. Another process can determine the name and other personal information of the payee 26, i.e. address and telephone number, if available and store this postprinted information as text, font and formatting information (page description information). The image of this data is then separated from the foreground image.

Since it is preferred that the check scanning device be allowed to operate at peak speed, and finite delays in information access and processing occur after the entire check is scanned, the system will generally operate with a processing latency wherein a result is not produced until some time after the scanning has occurred, and likely after a subsequent check has been scanned. In such an instance, it is preferred that the processing system globally optimize the processing based on the availability of data, which may result in out-of-order processing of information. For example, if a first check does not include a zebra code and a second check does, it is likely that the processing of the second check, which requires less processing, will be completed before the first check, which requires only simple processing, even if this delays the processing of the first check slightly. Thus, once scanned, image data records will then be queued up for further processing when the necessary data becomes available to the processor. Checks that have a unique identifying code may be run first, before checks which require more extensive processing, as they can then be compressed much quicker than the ones without any code. In one embodiment according to the present invention, the processing system is not a dedicated image processor, but rather a standard type personal computer or workstation. In this case, the pattern matching delays may be very long, with in-process check images stored on magnetic disk. In such a case, zebra coded checks will likely be processed in real time, while those which must be matched without the assistance of precoding will be delayed, and processed as necessary information or processing resources become available. This may create a substantial backlog of unprocessed images, but this does not cause a problem in a low production environment, where cost effectiveness is more important than high productivity.

If there is no identifying or zebra code on the image to unequivocally identify the background image, an image analysis is done on the check image in order to gain as much information about the check as possible or as necessary. This will minimize the number of times the database needs to be accessed, and the number of database records which need be retrieved, in order to maintain the throughput of the system. The background, or a portion thereof, is analyzed to determine if there is a repeatable pattern 76. If the pattern segment repeats, the segment is classified as a background pattern for this check image 78, at least for the area analyzed or for a portion of the image. As stated above, this intermediate result may be used in an image compression system to define the background by specifying the pattern and its spatially repeated characteristics. The image pattern, however, continues to be processed, as a unique identification of the identity of the check form will produce superior compression results. The identification of a background pattern is used in the image matching system to select a subset of images with a corresponding background pattern.

The image is preferably analyzed for the existence of a number of characteristics, the union of which will define a relatively small number of possible matches in the database.

The database images with corresponding repeatable pattern segments in the background, a primary key for searching, are preferably banded together on the storage medium, which is preferably a CD-ROM or CD-ROM with a fast magnetic hard disk shadow, for efficient accessing. If a second primary key is applied, a second storage subsystem with bands corresponding to the second characteristic is preferably employed. A second key may be, e.g., color, lithographic technique, paper quality or type, etc. The pattern segments are compared to those in the subset of the database for a match. The comparison is preferably done via a rule-based expert system to determine if any conflicts exist (such as extraneous or missing data). Otherwise, the matching is done using a pattern recognition algorithm known in the art. The rule-based system will typically follow the production system model consisting of a set of rules and a database of facts. This can be done with the use of the multi-processor and distributive processing hardware. If there are no conflicts, i.e. the background image matches one of the patterns in the database, the background of the image can be replaced with the code of the pattern from the database codebook 110. If the match is not exact to one in the database, but is within certain prescribed tolerances ($\lambda$) 112, the background can still be replaced with the code from the database codebook 114, but the error or deviance from the exact match is preferably compressed and included in the composite compressed image 116. Once the background image has been matched, the process to filter out the background from the image can be batch processed with checks of the same background either in turn or in parallel.

Because of the relatively slow access and data transfer rates of a CD-ROM, the preferred distribution media for the image database, the read head should be predictively positioned near the data to be retrieved, so that the distance of head movement between accesses is minimized to the extent possible. Further, the number of accesses and the amount of data that needs to be transferred is preferably minimized.

The pattern recognition algorithms, for extracting a background pattern from the check, preferably use a tuned filter (e.g. a spatial image processing filter which is selective for a pattern or class of patterns), for the similar characteristics of the background such as image and colors 102. A subset of the database is defined to minimize the number of accesses to the database 104 and the database is searched accordingly 106.

A rule based system analyzes the image for conflicts in the pattern extraction system, and attempts to resolve them. If resolved, the new pattern is then analyzed to determine if it is a repeating pattern. A repeating pattern will define a subset of images in the database. If the background does not contain a repeating pattern, then it is analyzed for the presence of other characteristics, which may be found on checks which do not have repeating patterns. This may require analysis of the entire check, or the characteristic may be extracted from a portion of the check.

The match processing system may also determine whether there is a partial match. If there is a partial match to more than one image 118, a composite description is created 120 describing how the check is a composite of the multiple stored images and what (if any) are the differences 122. This method of compression will only be employed if the resultant compressed image is smaller than a file created using other methods. If there is not a complete match, i.e. not all of the conflicts can be resolved, the background will be compressed and an error analysis will be appended describing what are the unresolved conflicts.

Thus, the present system provides a variable size compressed image corresponding to the check image, with the size of the image varying from a simple series of codes which defines the check, including an optimally compressed image of the handwritten and post-printed information using a model-based compression approach, to a full image compression for an undecipherable check 124. It is preferred that any check which is of particularly poor quality be manually processed, as it is likely to require manual analysis in any case, and a highly compressed image may tend to lose important data, especially in a poor quality original. Thus, the ultimate exception handling sequence includes operator intervention.

If a pattern is identified, it is then compared to a stored set of libraries of backgrounds to determine if the background is of a standard type, e.g. a type by which entries in the database are indexed. The libraries will consist of raw check images, and may also include characterization data relating to those images. If it is desired to reduce the size of the image database, then these images themselves may be compressed by a model-based compression algorithm which defines an image with respect to simpler graphic primitives. Thus, although preferred, it is not necessary to store entire backgrounds of the standard checks since the background is normally of a repetitive nature. A copy of the database preferably is tailored to fit on a single CD-ROM or other integral storage unit. Because of banding requirements, if space permits, an image of a check may appear in multiple positions in the database; however the identifying data should remain the same for the image regardless of which copy is recognized as a match.

Compressed storage of the image template or model data of the database is preferred because it reduces the penalty of the slow data transfer rate of a CD-ROM, and allows quicker access of related image data. Compressed storage also increases effective storage capacity of the CD-ROM.

It is only necessary to maintain in the library enough information to recognize the repetitive nature of the background. The background information stored in the database may be in a standard compressed format. If the format is not lossless, then an error analysis mechanism is provided to ensure a match. When particular information is retrieved, it can be decompressed for the pattern recognition and analysis. On the other hand, depending on the type of compression employed for data in the database and the requirements of the pattern recognition system, the image data may be analyzed without decompression or with only partial decompression. In such a case, it is preferred that the compression format be compatible with the pattern recognition and analysis format.

The libraries in the database are preferably correlated into a codebook of standard check background images. These libraries are based on certain groupings or bands of information. These bands will consist of similar colors or types of patterns. In order to maintain the efficiency of the system, when it is determined that the background pattern is within a certain band on the CD-ROM with particular characteristics, the contents of that band may be predictively transferred to a cache for prospective analysis. Preferably, the rate of downloading of data will meet or exceed the processing speed of the matching process; however, if the data access is slower, then the system may perform other tasks until the necessary data becomes available. Other libraries in the database include, for example, image features of the checks, account numbers or other identifying information with known backgrounds, account numbers or other identifying information with unknown backgrounds, signatures and other handwritten information or specialized backgrounds, e.g. computer screen, stock certificates or corporate bond certificates. These can be linked together in a dependent fashion depending upon the priority of the list of features or information.

In the preferred embodiment, according to the present invention, the matching process should preferably have a throughput at least 30 checks per minute, i.e. take no more than two (2) seconds for any one scanned check to be scanned before the next scanning operation commences, although a long latency for completion of processing is permissible. Further, this processing rate, while preferably sustainable indefinitely, should be sustainable for at least one hour. If, within the time constraints, no match to the database is found, the pattern matching process will be terminated and the entire image will be compressed using standard compression techniques.

Such standard techniques include compression by defining a set of Fourier coefficients or wavelet coefficients to describe the image with a reduction in raw data. In addition, new images may be added to the library, as an addendum in a temporary storage medium, such as RAM, local magnetic hard drive, EEPROM or flash memory. These added data entries preferably include the same indexing as the database itself, although any addenda may be processed separately and by different criteria, i.e. since these are stored on a more accessible media, the matching need not be optimized for the presumed slow access of the main data store. If these unrecognized checks meet the criteria established, they are included in an update of the distributed database. If the system is on-line, the new image may also be sent to a clearinghouse or the other banking sites so that the other libraries may be updated on a real-time basis. These may also be updated at a later time.

Regarding the detection of the background image of an unknown inputted document image, one may elect to compute some feature analysis during or immediately following scanning to accelerate the task of determining the background from the codebook database. As an example, a color scanner may be designed to set certain mask bits indicating a scanned document has some particular color, e.g. red. The bits set during scanning may be used to direct further processing of unknown input images, e.g., the red color bit is set during scanning, but the yellow color bit is not set. The document image can then be further processed with other images containing red in bulk fashion, but completely separate and independent from those document images containing yellow.

The foregoing implies that a hierarchical codebook organization is possible. Several independent and separate codebook databases can be organized whereby members of the same codebook share perhaps some common features. Continuing the example, there can be election to have a "yellow" codebook, i.e. background templates that contain some yellow are "clustered" together in one logical codebook, and thus only unknown input images with a yellow bit set need be tested against this codebook. Concurrently, there may also be a "red" codebook to process unknown input images against with red, but not yellow.

The approach is know in the art and many different features can be used for this organization. The intent is to divide "feature space" into separate domains of the database that can be inspected in parallel. The computational benefit is the reduction of the size of a codebook that is searched, and the parallel processing of multiple unknown input images.

By way of example, if there are 100 backgrounds, 50 of which have yellow but no red, and 50 of which have red but no yellow. Then, given an unknown input image of a document, known to have yellow, the document would be compared to at most 50 backgrounds, rather than at most 100 backgrounds. Therefore, the computational complexity of the search has been reduced in the worst case by halving the size of the codebook database searched. In parallel, a search of the red codebook for an unknown image, will cause the same reduction in computational complexity. And since both the red and yellow documents may be processed in parallel by two separate parallel processors, obvious reduction time is multiplied.

Now, however, designing a means of forming hierarchical codebooks by further dividing the yellow codebook into multiple, smaller, disjoint or small overlapping codebooks, e.g. yellow and blue but no purple codebook, or yellow and purple but no blue codebook is possible.

Further, the hierarchically organized codebooks define a logical decision tree or indexing structure for searching a database of templates. This means that the processing of an unknown input image on a single processor can be accomplished with hierarchical codebook organizations simply by using the organization as a search tree to find relevant templates for comparison to the input image. Thus, the organization serves as a single database indexing structure, or a decision tree, or a means of parallel processing multiple images against separate collections of templates.

Producing several codebooks or possibly hierarchical codebook organizations, requires a means of dividing the set of background image templates into subsets that contain related backgrounds, according to some criteria over feature space, while the subsets are disjoint, i.e. two members of two distinct subsets have distinct feature values.

Such organizations of data and databases are commonly achieved by various clustering algorithms. Clustering algorithms are generally iterative optimization programs that in piecemeal fashion compute averages over some feature domain of individual objects, i.e. document image background template, in such a way as to minimize global optimization criteria, e.g., the minimum squared-error criterion. Those skilled in the art will understand that such programs approximate maximum likelihood estimates over the means.

It is sought to have easily detectable features that can cluster backgrounds into related subsets of hierarchically organized codebooks. It should be further understood that any number of possible features can be used, for example statistical measures, spatial domain features, frequency domain features, relationships between objects or other features.

One can further define a centroid template of each distinguished subset that may be used to detect early in the process which codebook to search given some unknown image. The unknown image is first compared to a set of centroid templates that embody perhaps a number of feature values, and the closest matching centroid indicates that the background for the image is to be found in the codebook that it represents. The centroid may be computed by a clustering program that computes the means of the feature values of the members of the codebook formed by clustering. Such centroids represent mean feature values of some sort that are chosen or computed by some clustering program to accurately distinguish the unknown background information.

The clustering program itself may be viewed as an offline process performed to initialize a set of codebooks or hierarchically organized codebooks. As such, it may be executed in parallel for efficiency in speed either to initialize codebooks, or to update existing codebooks, or for entire reorganization of existing codebooks.

The manner in which clustering programs can be executed in parallel is similar to the manner in which unknown images are compared to or searched in a codebook of templates. Here, it is iteratively compared to a distinct template, t, to all previously processed templates presently residing in some codebook, $C_i$, where i is greater than 1. Some distance function, d, is computed between t and every codebook by computing the distance of t from some member of $C_i$ or a centroid representing $C_i$. That codebook $C_j$ found to have some minimum distance is selected for membership by t, i.e., t is assigned to $C_j$, and $C_j$'s average feature values are updated to reflect the incorporation of t in its subset.

Further processing of the selected subset is possible, for example recomputation of some global mean or statistic for all present members of the selected codebook. Such recomputation statistics, like the mean, can be used to represent the centroid template of the subset used for further processing of additional template backgrounds. The comparison of t to existing codebooks can be performed in parallel. The computation of statistics for a distinct codebook, like the mean values of some feature, can likewise be performed in parallel.

As part of the parallel processing, the foreground information can also been compressed. As noted above, the bank information and the border can be truncated and replaced with codes. Any other preprinted information that is supplied by the printer, such as "Pay to the Order of" 42, "Memo" 38, "Signature" 36, "Dollars" 34, "Date" 30, check number 32, digitalized code 56 or any other information that is printed on the check as part of the standard printing information, is either part of, for example the zebra code or 2-dimensional coding and can be truncated, or can be replaced with standard text characters with font and formatting information for standard compression 38.

The scanned data is now compressed by deleting the background pattern and the preprinted information, leaving only the personalized information from the check along with the code for the background pattern and the preprinted, foreground information. As with the data recognition of the background information, the personalized portions will work the same with the use of the pattern directed inference system and the rule based algorithms.

In one embodiment according to the present invention, the payor's signature on the check 50 is verified for authenticity by comparing it with a database of signatures 84 including a representation of the signature of the drawer. If the signature does not match a corresponding signature in the database 86, the bank operator needs to be informed for manual verification and the possibility of a possible fraudulent check 88.

In the preferred system, the written amount 54 will be checked for against the numerical value written 48 to ensure that they are the same and to ensure that there is a sufficiency of funds in the payor's account. The date 46 is determined from the written information 90 and is then verified to safeguard against a stale check (normally one more than three months to a year old, depending upon the type of check) or a check that has been post-dated, i.e. where the date on the check is later than the actual day of deposit 92. The bank operator is preferably informed of any problems with the dating of the check 94. Endorsements on the back side of the check are also preferably examined for accuracy, fraud and authentication by comparing it against the stored signatures in the database.

If the foreground data is handwritten, it can be further reduced by employing the model-based algorithm of B-spline 98. This will compress the written characters to control points. In order to save space on the database medium, the preferred method will only have the B-spline control points stored for comparison of the payor's signature and of the endorser's signature. If the data is typed or printed on the check, such as for the check amount, or the courtesy figure, the processor need only determine the font and formatting characteristics of the information 100. The image portions of this information can now also be eliminated, further compressing the data to be transmitted and stored.

In order for the banking system to maintain security and transmission verification, encoding and encryption preferably employed on the compressed data before transmitting to the other sites or to the clearinghouse. A protocol is established between the connecting facilities. The compressed check image may be encoded, e.g. given a transaction identifier, based on the number of transactions done that day or the number of checks that were scanned, or some standard form of encryption coding. The transmitting facility must request authorization from the receiving facility to send the compressed data.

The compressed data is now transmitted to the central storage device via a telecommunications system, e.g. internet system. The receiving facility would either be the payor bank or a clearinghouse. The compressed image is preferably archived at at least one of these institutions. If it is transmitted to the clearinghouse, it must then be transmitted again to the payor bank. After the data is transmitted, the transmitting facility needs to know that the transmission was valid and that the data was received correctly by the receiving facility. Once this is accomplished, the transmitting facility will either erase the compressed data from its storage or alter it indicating that the image has been transmitted to another facility. This will keep the system integrity secure and will ensure that the check is processed only once. If there is to be multiple transmissions of the data, e.g. between the payee bank and the clearinghouse and then between the clearinghouse and the payor bank, there is preferably a system including multiple levels of encryption. In this instance, the payee bank will put on two levels of encoding. The first one is to be decoded by the clearinghouse and the second one is to be decoded by the payor bank. The clearinghouse is in this sense acting as a controller of the data and does not need to actually know what the data is. All the clearinghouse needs to know is where the data is to be sent. This information can be built into the outside encryption method. If there are not the proper levels of encryption, or the codes are not correct, the transmission is deemed not valid and a retry is requested. If the encryption is still not correct, the receiving facility will be so notified as to a possible fraudulent transmission.

After completing the correct protocol with the transmitting facility and establishing a valid transmission to the payor bank, the originator's account will be settled and a statement will be sent to the originator. Otherwise an error flag will be sent to the computer operator indicating that there is a problem with the check.

Instead of electronically transmitting the compressed image of the check, another method is to download the image onto magnetic media and transport the media via conventional physical transfer mechanisms. This may be done in lieu of setting up a secured and/or trusted series of network communication and still obtaining some of the benefits of compressing the data. Bulk transport of the mass amounts of physical paper checks is no longer necessary and is replaced with it all on magnetic media. Such physical transport may also be employed in case of failure of the telecommunications network.

Another embodiment according to the present invention includes a scanner that produces multiple images at different resolutions and gradient scales. This way there is a greater probability of being able to match the background information with the information stored in the database. This will aid the matching of the models in the database to the scanned image. As discussed above, an ultra-high resolution scanning may be required to image and verify certain anti-fraud lithography on the check.

As discussed above, images of text may be subjected to optical character recognition (OCR) for decomposition into text, font and formatting information. The present invention also allows the use of other presently available or future options, and is thus compatible with OCR data conversion (even if done manually) or any other type of commercial scanning process. Thus, after the check image is scanned, the data is available for any type of analysis, including the present model-based pattern recognition and extraction techniques. This compatibility with standard OCR systems and the like is especially helpful for post-printed, typed information such as the alpha-numeric amount, courtesy amount or even the signature (if stamped). This information may be captured from the various subsystems and can then all be reduced to codes in the codebook. The decompression and regeneration of the checks would then be of a cleaner version then the original.

Likewise, the image data remaining after elimination of the background image information may be further reduced by going through standard compression algorithms, as for example JPEG in order to eliminate any white space or other redundancies. See Wallace, G. K., "The JPEG Still Picture Compression Standard", *Communications of the ACM,* 34(4): 30–44 (1991). Thus, the present invention may be applied as an open system, which is compatible and works in tandem with existing related systems. Other image compression methods are also known, including ABIC, U4, and run length encoding.

Along with doing parallel operations for the background and various foreground data checks via a multi-processor system, the searching for the background code and/or the scanned image pattern can be broken down and searched for over a network of processors, which may be loosely or tightly coupled. See Tanenbaum, *Modern Operating Systems,* pp. 3, 362–394 for a discussion of distributed process operating systems. In this case, it is preferred that each processor maintain locally in fast memory at least a related sub-set of the total database. The scanned image is broadcast over a secured network to a number of processor sites and each site can search its portion of the total database in a fraction of the time it would take to access the entire database as a whole. The different databases would have different criteria to search for, e.g. different compressed images, different scales of scanned images or different search algorithms. Once a match is found, a broadcast message goes out to the other processors in the network to cease the search and the matching code is sent to the original site that initiated the search. Otherwise, a "not found" indication is sent across the network, after the slowest processor completes its necessary tasks. This method greatly reduces search time but there is a cost in order to communicate over a secured network between the separate processor sites. If these sites are remote, then an encryption security method is preferably employed, similar to those described above with respect to transmission to the clearinghouse or other banks.

Another embodiment according to the present invention includes a system in which the image to be matched does not come from a paper scanning device. Instead, the image is generated directly in the computer such as from a computer graphics package. This can be done from a drawing that was originally created or altered on a computer. Of course, the most efficient compression of this data is identifying information on how it was created and the customized information. If such information is not available, then the pixel image is processed similarly to the model-based image pattern recognition and compression system described above.

In general, when a code for the background information is found in the database and the code then replaces the actual background in the subtraction and compression method, the check can be reconstructed with different scales, resolutions and sizes, depending upon the requirements of the requester of the copy. Further, when the compression system is broadly viewed as being for optimal compression of any of a number of types of image data, the ability to reproduce the entire image or portions thereof with varying resolution is useful. For example, if the scanner operates at 600 dpi, with portions scanned at 2400 dpi, it is preferred that a copy be produced at 300 dpi, a standard laser printer resolution, unless this additional information is necessary. Likewise, if the image is scanned at 600 dpi, while a 2400 dpi printer is being employed, the matched background may be printed at the full 2400 dpi resolution, derived from an exemplar check, rather than the 600 dpi as scanned. If handwritten information is stored as B-spline control points, this data may also be scaled in printer resolution manner and output at the maximum resolution available. Further, if desired, signature information may be output at maximum resolution, while other information output at lower resolution. The present system also allows reproduction of only a portion of the image, e.g. the foreground, with elimination of the background. This may be employed to provide a customer with a monthly statement where no irregularities are suspected. The present scalable output system also allows "cameo" representations to be presented.

The present variable resolution reproduction allows for a high resolution computer output microfilm (COM) to be produced from the compressed record, if such a backup is desired. This system may actually allow a higher resolution image to be stored than by standard microfilming or microfiching techniques, and simplifies the elaborate production necessary in order to directly microfilm checks.

The present example relates to a further adaptation of the data compression and storage system for reducing fraud and improving security in banking practice. In this instance, a bank security camera may capture an image or series of images of a person cashing a check. Information relating to the person is separated from the background, and the image compressed. The compressed image may then be appended to the check record, to allow identification of the person cashing the check should this be an issue. Alternatively, data relating to a fingerprint of the person cashing the check may be captured, compressed or analyzed, and appended to the image data file. This concept could thus be used for storing and transmitting identification information for law enforcement networks.

A video analysis system may also be used, in conjunction with a model based analyzer to efficiently generate a detailed representation of an individual from a series of video frames or from a scanned photograph. This may be done in conjunction with a type of identification card with a person's picture on it. Rotational algorithms may need to be implemented in order to normalize an image to a frontal orientation. The image may also be checked in real time against a database of images of depositors. This verification may be by automated methods or by presenting the stored and live image to an operator to verify. Therefore, the person cashing the check or document can be immediately verified as the person to whom the document is made out to.

An efficient method of identifying the bank customer who cashes the check is, if the person's image is present in the database, to append a code to the financial transaction record including the check information as well as an index code to an image of the person in the bank's database. Information relating to the check's casher only needs to be stored long enough for the check to be cleared through the system and for the originator to be notified of the check's disposition. Once that takes place and there is no question as to the casher of the check, the compressed image can be removed and only the original information on the check needs to be stored for the required length of time as per banking procedures. If the person's video image is not in the data base, then an entire compressed image (with the background of the bank removed) may be sent, or retained by the bank, with the check for verification of the payee until the check is cleared.

As an alternative to video camera images or a scanned photograph image, a fingerprint of the payee can be taken when the payee goes to the payee bank to cash or deposit the check. The fingerprint image is to be scanned with a special scanner, which may include a laser or other mechanism known in the art. The resulting fingerprint image is compressed using known techniques, and matched to a fingerprint identification database. If there is no match, then the fingerprint stored in compressed form by known methods and the compressed image is sent with the compressed check image. As with the video image, the fingerprint image need not remain with the compressed check image for the required length of time as per banking standards, but only long enough for the payee to be verified as the intended payee. This is an added measure of security against fraud.

A further embodiment of the image pattern recognition system according to the present invention is to implement the system using optical computing techniques. An optical image correlator may be used to identify the check background and produce a transformed residual image, which may then be further compressed. The optical image correlator may be an electrooptic device operating on scanned image data, which is projected by laser beam from a modulated light shutter onto a holographic crystal onto which a plurality of latent background images have been stored. When a background pattern matches one of the stored patterns, the resulting image will differ, in a manner indicative of which image is recognized, from an unrecognized image. Further, the error signal after the optical correlator represents the correlator error, which is the foreground signal and any noise.

A full optical system is also possible, in which the check is illuminated by laser, and the reflected image is then subjected to an optical correlator which includes latent images of a plurality of check background images. The laser light passes through the crystal, and produces a pattern, which is detected by an electronic image sensor, e.g. CCD or CID array, which represents a background identification (if any) and a residual which represents the foreground and noise.

In a further embodiment, a check is imaged by a 300 dpi line imaging scanner, with a scan width of about 4.5 inches, and which acquires a color image in a single pass. This scanner is arranged to obtain an image of both sides of the check, by sequentially imaging both sides with a single imaging scanner, or providing two opposed imaging scanners. The image is obtained with a 6 bit scale for each color, thereby providing 18 bit color. The scanner has a motorized feed, which advances the check through the scanner head. A feeder may be provided, although checks may be fed manually.

The output of the scanner is fed into a data port of a computer system. The computer system includes a central processor, which is, e.g., an Intel 486 class processor (DX2-33, DX-50, DX4-75, DX4-100, etc.) with primary cache, with a 256k Byte secondary cache, and 8–16M Bytes RAM. The processor system is interfaced to a hard disk drive having 250–1000 MBytes of storage. The processor system is also interfaced to a double speed CD-ROM device. The scanner and CD-ROM are preferably interfaced to the processor system by way of a SCSI interface. The hard drive may be either a SCSI or IDE device. The processor system also has a floppy disk drive and a modem.

In operation, a check is scanned by the scanner. The information is transferred to the processor system through the SCSI interface. The entire image is buffered in RAM. The check image is first analyzed for the appearance of an identifying code, such as a zebra code. If this is not identified, the image is then analyzed for information identifying the manufacturer or style of the check. If this identifying information is not located, a portion of the check background is then extracted and analyzed. Certain characteristics are then identified in this portion. A database, resident on the CD-ROM, which is transferred to the hard drive and buffered in RAM, is searched to identify backgrounds contained on the CD-ROM which are possible matches for the unidentified check. These possible matches are ranked according to ease of access on the CD-ROM and likelihood of match, and are sequentially retrieved from the CD-ROM and compared with the unidentified image, until a match is found. If no match is found, the unidentified image is compressed according to known methods.

If a match is found, the matched background is subtracted from the foreground image. The foreground image is compressed by identification and characterization of printed information, and B-spline decomposition of handwritten information. The various compressed information is concatenated into a single data file, and encrypted. The encrypted file is stored on the hard drive for later transmission by physical (floppy disk) or electronic transmission.

In a yet another embodiment, a check is imaged by a 600 dpi two-sided line imaging scanner, with a scan width of about 4.5 inches, and which acquires a color image in a single pass. The image is obtained with a 8 bit scale for each color, thereby providing 24 bit color. The scanner has an automated feed, which sequentially advances the checks through the scanner head.

The scanner is interfaced by way of a SCSI interface to a computer system. The computer system includes a central processor, which is, e.g., an Intel Pentium class processor with a 256 kbyte secondary cache, and 16 MBytes RAM. The processor system is interfaced to a hard disk drive having 1–2 GBytes of storage. The processor system is also interfaced to a quad or higher speed CD-ROM device. The hard drive and CD-ROM are preferably interfaced to the processor system by way of a SCSI interface. The processor system also includes a digital signal processor or dedicated image processor as a coprocessor. The processor system also has a floppy disk drive and a modem.

In operation, both sides of a check are scanned by the scanner. The information is transferred to the processor system through the SCSI interface. The entire image is buffered in RAM. The check image is first analyzed for the appearance of an identifying code, such as a zebra code. If this is not identified, the image is then analyzed for information identifying the manufacturer or style of the check. If this identifying information is not located, a portion of the check background is then extracted and analyzed. Certain characteristics are then identified in this portion. A database, previously transferred from the CD-ROM to the hard drive is buffered in RAM and is searched to identify known backgrounds which are possible matches for the unidentified check. These possible matches are ranked according to ease of access on the CD-ROM and likelihood of match, and are sequentially retrieved from the hard drive and compared with the unidentified image, until a match is found in the DSP of image processing coprocessor. If no match is found, the unidentified image is compressed by the coprocessor according to known methods.

If a match is found, the matched background is filtered from the foreground image. The foreground image is compressed by identification and characterization of printed information, and B-spline decomposition of handwritten information by the coprocessor. The various compressed information is transferred to the primary processor and concatenated into a single data file, and encrypted. The encrypted file is stored on the hard drive for later transmission by secure electronic transmission.

In a still another embodiment, a check initially scanned by a spatial frequency detector, which detects a maximum level of spatial detail of the front and back of a check to be scanned. The check is then imaged by a 600 dpi two-sided imaging scanner, with a scan width of about 4.5 inches, and which acquires a color image in a single pass. The image is obtained with a 8 bit scale for each color, thereby providing 24 bit color. Areas which are identified by the spatial frequency detector as having a spatial frequency of greater than about 200 per inch are then scanned by a second scanning system at a resolution of about 2400 dpi. The scanner has an automated feed, which sequentially advances the checks through the scanner head. The scanner is included in a system which can store images of a large number, i.e. greater than about 100, check images, including the high resolution image.

The scanner is interfaced by way of a SCSI interface or a high speed link, e.g., FDDI, ATM, 100baseVG, etc., to a computer system. The computer system includes a closely linked parallel processing network, each node including a central processor, which is, e.g., an Intel Pentium class processor with a 256 kbyte secondary cache, and 16 MBytes RAM, and a CD-ROM drive.

Equivalents

The above description, figures and embodiments are provided not to limit the invention but to assist one skilled in the art in better understanding the invention contained herein. The inventor is not thereby limited to the preferred embodiments. For example, checks may be replaced herein any arbitrary form, document, computer generated image, fingerprint image, voiceprint, and so forth. The disclosure provided in terms of check processing and banking practices may be viewed as a equivalent to any arbitrarily organized document or form processing operation or system in any business, technical or organizational structure.

I claim:

1. A method for processing an image from a document, said method comprising the steps of:
    (a) scanning the document, said scanning including creating a first digital image corresponding to said image on said document;
    (b) searching a codebook comprising a plurality of stored digital images for one of said stored digital images which is present in at least a portion or portions of said first digital image;
    (c) producing and storing an electronic index code that identifies said one of said stored digital images as being present in said at least a portion or portions of said first digital image;
    (d) generating a second digital image comprising the portion or portions of said first digital image that are not present in said one of said stored digital images by separating said stored digital image from said first digital image; and
    (e) preserving said second digital image, said stored electronic index code, and said codebook in a form such that said first digital image can be reproduced from the combination of said second digital image and said stored digital image.

2. The method according to claim 1, wherein said stored digital images in said codebook are clustered into a logical collection of related digital images.

3. The method according to claim 1, wherein said scanning step employs optical raster scanning.

4. The method according to claim 1, wherein said document comprises a document selected from the group consisting of a check, bank deposit or withdrawal slip, coupon, travelers' cheque, letter of credit, monetary instrument, food stamp, insurance form, medical form, real estate form, an inventory form, real estate document, official government form, brochures, instructional form, questionnaire form, laboratory data form, tax form, computer screen, stock certificate and bond certificate.

5. The method according to claim 1, wherein said document is a check.

6. The method according to claim 1, wherein said stored digital images in said codebook are clustered into a logical collection of related digital images.

7. A method according to claim 1, wherein said searching of said codebook of stored digital images is performed in parallel by distributing said first digital image to a plurality of processing means.

8. The method according to claim 7, wherein said stored digital images in said codebook are clustered into a logical collection of related digital images.

9. The method of claim 1 wherein said preserving of said second digital image includes compressing said second digital image and generating therefrom a compressed digital image.

10. The method of claim 9, and further comprising:
decompressing said compressed digital image image to yield a third digital image;
using said index code record to identify and access a fourth digital image;
combining said third digital image record with said fourth digital image record to yield a restored digital image.

11. The method of claim 10 and further comprising:
displaying the restored digital image in a form in which said restored digital image may be viewed.

12. A method for recording an image from a document, said method comprising the steps of:
(a) scanning the document, said scanning including creating a first digital image corresponding to said image on said document;
(b) searching a codebook comprising a plurality of stored digital images for one of said digital images which is present in at least a portion or portions of said first digital image; and
(c) on a determination that none of said stored digital images are present in said first digital image, creating a partial digital image representing said at least a portion or portions of the first digital image; and
(d) inserting said at least a portion or portions of said partial digital image into said codebook.

13. The method according to claim 12, wherein said stored digital images in said codebook are clustered into a logical collection of related digital images.

14. A method for recording an image from a document, said method comprising the steps of:
(a) scanning the document, said scanning including creating a first digital image corresponding to said image on said document;
(b) searching a codebook comprising a plurality of stored digital images for at least one of said stored digital images which are present in said first digital image;
(c) locating said at least one of said plurality of stored digital images in said codebook which are present in said first digital image;
(d) selecting one of said at least one of said plurality of stored digital images;
(e) producing an electronic index code identifying said one of said at least one of said plurality of stored digital images as being present in said first digital image;
(f) generating a second digital image comprising the portion or portions of said first digital image that are not present in said one of said at least one of said plurality of stored digital images; and
(g) preserving said second digital image, said electronic index code, and said codebook in a form such that said first digital image can be reproduced from a combination of said second digital image and said one of said at least one of said plurality of stored digital images.

15. The method according to claim 14, wherein said stored digital images in said codebook are clustered into a logical collection of related digital images.

16. The method of claim 14 wherein said preserving of said second digital image includes compressing said second digital image.

17. The method of claim 16, and further comprising:
decompressing said compressed digital image image to yield a third digital image;
using said index code to identify and access a fourth digital image;
combining said third digital image record with said fourth digital image record to yield a restored digital image.

18. The method of claim 17 and further comprising:
displaying the restored digital image in a form in which said restored digital image may be viewed.

19. An apparatus for recording an image from a document, said apparatus comprising:
(a) an input device for receiving said image from said document as an input and creating as an output a first digital image corresponding to the image;
(b) a database storage device storing a codebook comprising a plurality of stored digital images;
(c) at least one processor having a predetermined program, said processor performing the steps of
(i) comparing said first digital image with said stored digital images of said codebook;
(ii) identifying one of said stored digital images which constitutes a part of said first digital image;
(iii) producing an electronic index code indexed for said codebook, said electronic index code identifying said stored digital image as constituting part of said first digital image;
(iv) removing said stored digital image from said first digital image, said removing including producing a second digital image constituting the portion of said first digital image which is different from said stored digital image; and
(d) a memory receiving and preserving an input of said second digital image and said electronic index code.

20. The apparatus according to claim 19, further comprising a plurality of processors operating in parallel.

21. The apparatus according to claim 19, wherein said codebook comprises said stored digital images clustered in a logical collection of related digital images.

22. The method of claim 19 wherein said preserving of said second digital image includes compressing said second digital image.

23. The method of claim 22, and further comprising:
decompressing said compressed digital image image to yield a third digital image;

using said index code record to identify and access a fourth digital image;

combining said third digital image record with said fourth digital image record to yield a restored digital image.

24. The method of claim 23 and further comprising:

displaying the restored digital image in a form in which said restored digital image may be viewed.

25. A method for recording an image from a document, said method comprising the steps of:

(a) scanning the document, said scanning including creating a first digital image corresponding to said image on said document;

(b) searching a codebook comprising a plurality of stored digital images for one of said digital images which is present in said first digital image;

(c) producing an electronic index code identifying said one of said stored digital images as being present in said first digital image;

(d) generating a second digital image comprising the portion or portions of said first digital image that are not present in said stored digital image;

(e) deriving an indication from said second digital image whether said document is authentic; and (f) in the absence of said indication, generating a notification that said document is not authentic.

26. The method according to claim 25, wherein said stored digital images in said codebook are clustered into a logical collection of related digital images.

27. A method for recording an image from a document, said method comprising the steps of:

(a) scanning the document, said scanning including creating a first digital image corresponding to said image on said document;

(b) searching a codebook comprising a plurality of stored digital images for one of said digital images which is present in said first digital image;

(c) creating a second digital image from said first digital image;

(d) storing said second digital image in said codebook;

(e) producing an electronic index code identifying said one of said stored digital images as being present in said first digital image;

(f) generating a second digital image comprising the portion or portions of said first digital image that are not present in said one of said stored digital images; and (g) preserving said second digital images said electronic index code, and said codebook in a form such that said first digital image can be regenerated therefrom.

28. The method of claim 27 wherein said preserving of said second digital image includes compressing said second digital image.

29. The method of claim 28, and further comprising:

decompressing said compressed digital image image to yield a third digital image;

using said index code record to identify and access a fourth digital image;

combining said third digital image record with said fourth digital image record to yield a restored digital image.

30. The method of claim 29 and further comprising:

displaying the restored digital image in a form in which said restored digital image may be viewed.

31. A method for storing a document image of a document, said method comprising:

optically processing said document and generating a first electronic record corresponding to said document image;

generating second and third electronic records from said first electronic record, said second electronic record identifying at least one of a plurality of image records stored in an electronic codebook of image records, said identified image record matching a portion of said first electronic record, said third electronic record representing a portion of said first electronic record which is not present in said identified image record, said second and third electronic records and said codebook being in a form such that said first electronic record can be recreated therefrom.

32. The method according to claim 31, wherein said third electronic record is in a compressed form.

33. The method of claim 32 and further comprising;

decompressing said third electronic record to yield a decompressed digital image;

using said index code record to identify and access a fourth electronic record;

combining said decompressed digital image with said fourth electronic record to yield a restored digital image.

34. The method of claim 33 and further comprising;

displaying the restored digital image in a form in which said restored digital image may be viewed.

* * * * *